(12) United States Patent
Lee

(10) Patent No.: US 10,127,658 B2
(45) Date of Patent: Nov. 13, 2018

(54) GEOMETRY CORRECTION FOR COMPUTED TOMOGRAPHY

(71) Applicant: The Boeing Company, Chicago, IL (US)

(72) Inventor: James H. Lee, Ravensdale, CA (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 15/357,109

(22) Filed: Nov. 21, 2016

(65) Prior Publication Data

US 2018/0144462 A1 May 24, 2018

(51) Int. Cl.
*G06T 7/00* (2017.01)
*G06T 11/60* (2006.01)
*G06T 11/00* (2006.01)

(52) U.S. Cl.
CPC .......... *G06T 7/0012* (2013.01); *G06T 11/003* (2013.01); *G06T 11/60* (2013.01); *G06T 2207/10081* (2013.01)

(58) Field of Classification Search
CPC .. G06T 7/30; G06T 7/33; G06T 7/337; G06T 7/73; G06T 7/74; G06T 11/005; G01N 23/046; A61B 6/03; A61B 6/032; A61B 6/5205; A61B 6/5258
See application file for complete search history.

(56) References Cited

U.S. PATENT DOCUMENTS

| | | | | |
|---|---|---|---|---|
| 4,703,424 A | 10/1987 | Gullberg et al. | ............. | 364/414 |
| 2004/0167387 A1* | 8/2004 | Wollenweber et al. | ...... | 600/407 |
| 2016/0239971 A1* | 8/2016 | Yu et al. | ............... | G06T 7/0024 |
| 2018/0068467 A1 | 3/2018 | Wang et al. | .......... | G06T 11/005 |

OTHER PUBLICATIONS

Peters, Terry, "CT Image Reconstruction", Robarts Research Institute, Retrieved from the Internet: https://www.aapm.org/meetings/02AM/pdf/8372-23331.pdf, Accessed on Sep. 12, 2016, 2011, 49 pgs.
"U.S. Appl. No. 15/357,028, Ex Parte Quayle Action mailed Apr. 17, 2018", 7 pages.

* cited by examiner

*Primary Examiner* — Andrew W Johns
(74) *Attorney, Agent, or Firm* — Kwan & Olynick LLP

(57) ABSTRACT

Disclosed are apparatus and methods determining a center offset distance for computed tomography imaging. A specimen is positioned between an emission source for outputting radiation towards the specimen while the specimen rotates with respect to a detector for receiving radiation that has passed through the specimen. Projection data is collected from emissions received at the detector for multiple rotational positions of the specimen. A sinogram image is generated based on the projection data. The sinogram image is divided into image portions, which are superimposed and iteratively moved relative to each other by a relative offset so that a superimposed image peak in such superimposed image portions has a maximized height. A center offset distance for the sinogram image is defined as a relative offset between the superimposed image portions that results in the maximized height. If the center offset distance is zero, the superimposed image portions will be superimposed so that their edges are aligned to result in the maximized height. A specimen image is reconstructed using the determined center offset distance.

20 Claims, 20 Drawing Sheets

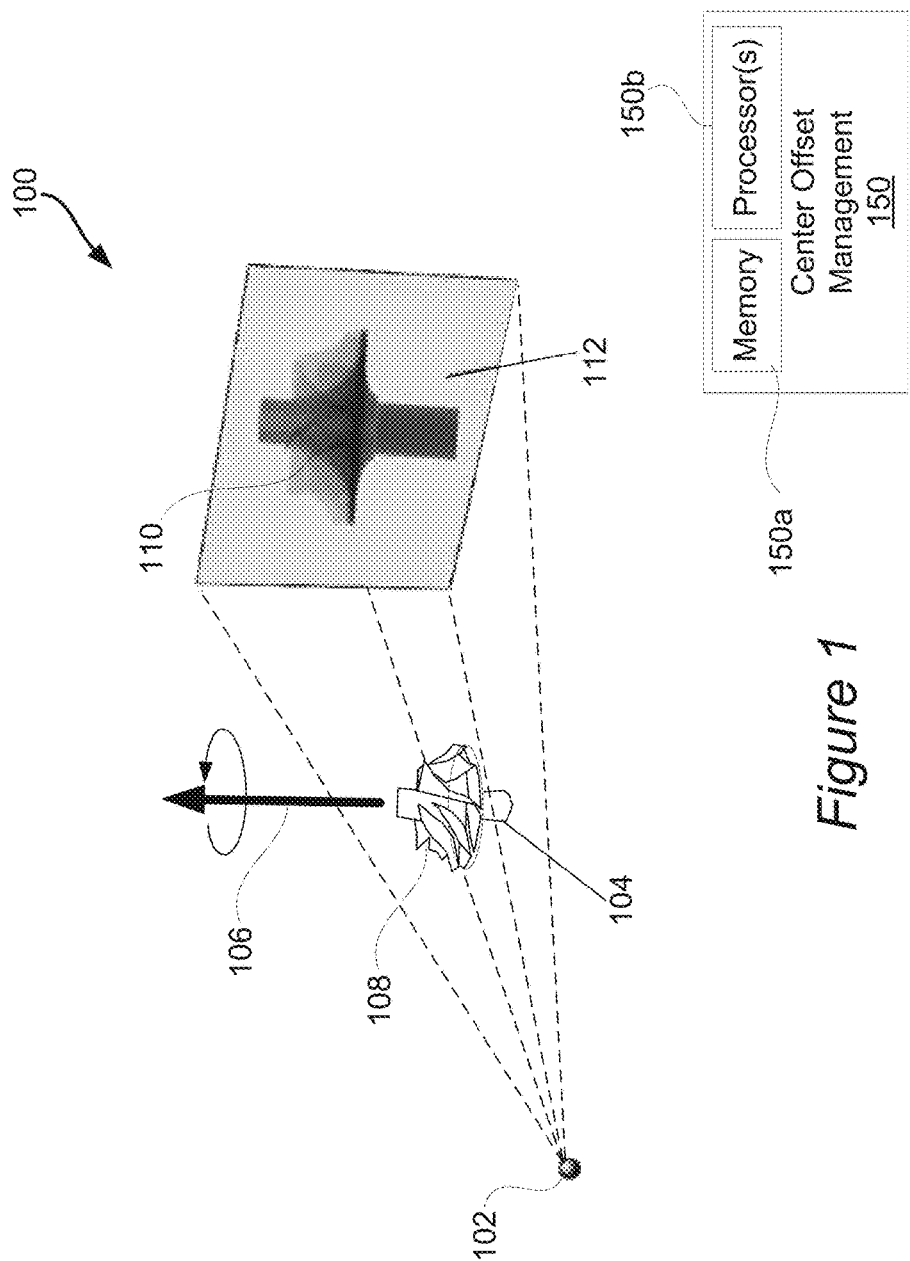

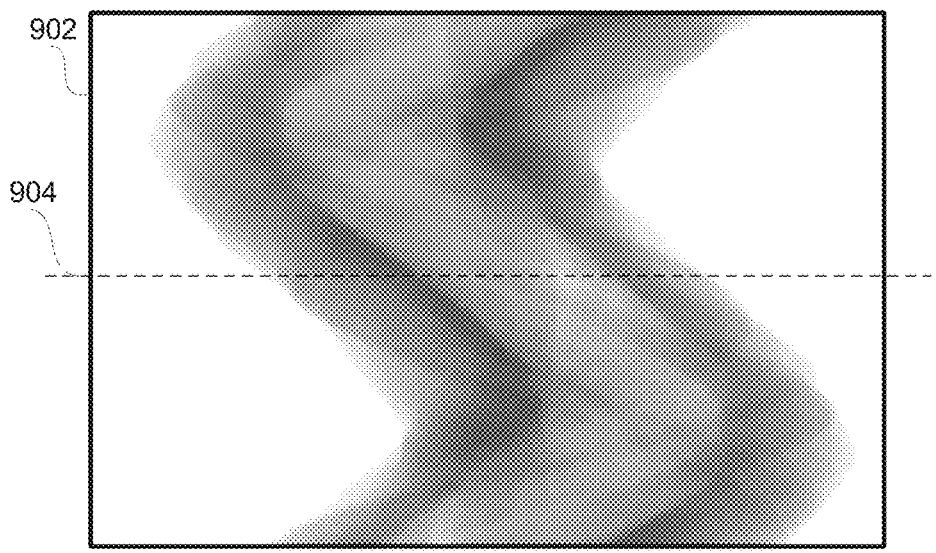
Figure 9A
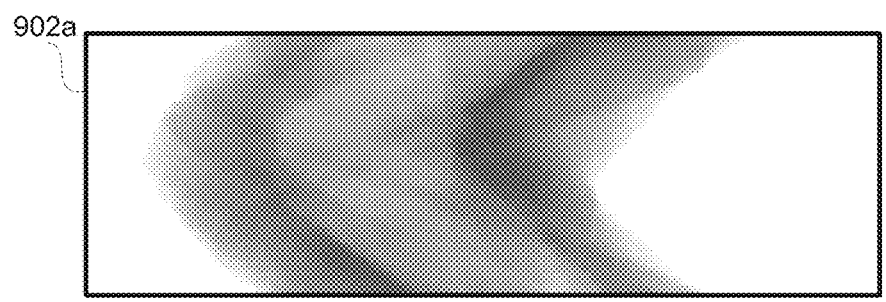
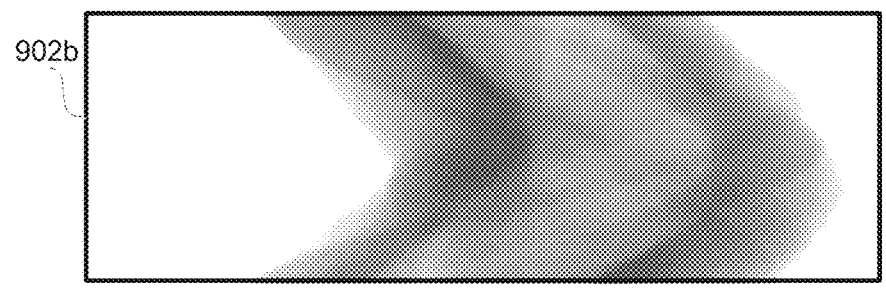
Figure 9B

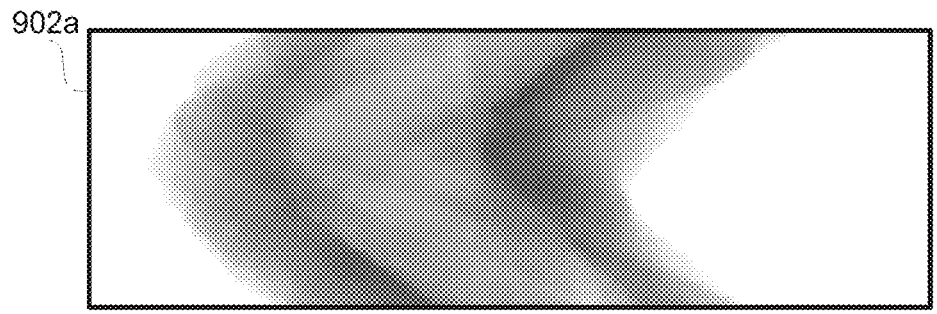
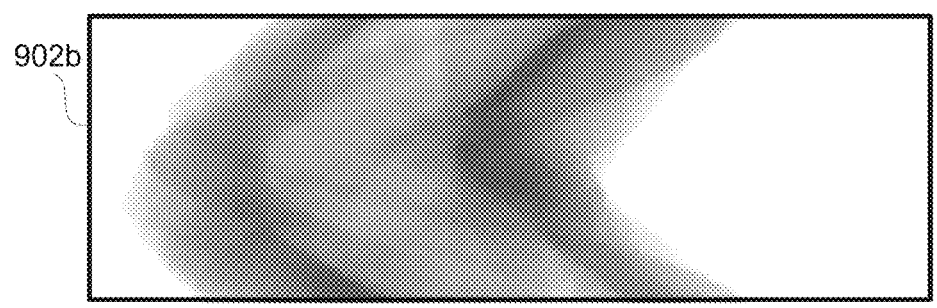
Figure 9C
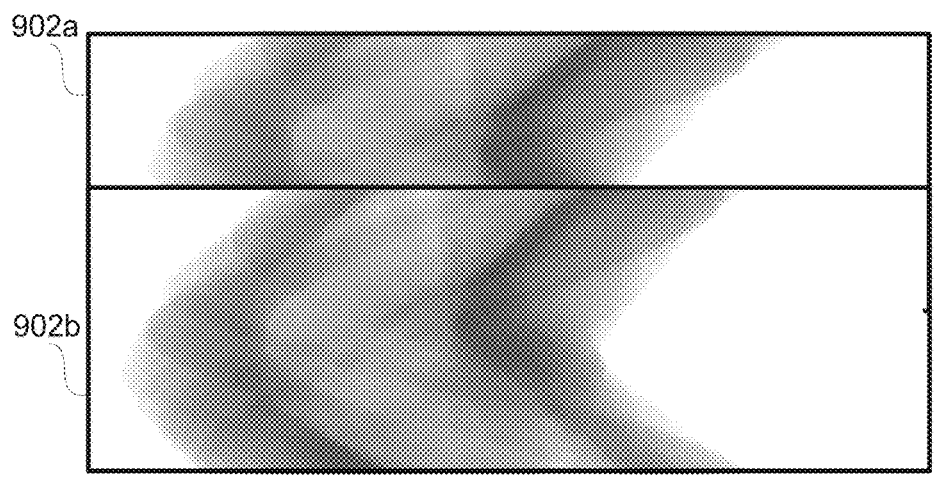
Figure 9D

GEOMETRY CORRECTION FOR COMPUTED TOMOGRAPHY

TECHNICAL FIELD

The present invention relates generally to methods and systems for computed tomography (CT) and, more specifically, to center offset calibration for image reconstruction in such CT systems.

BACKGROUND

A CT system is one that takes a series of 2D radiographs of an object or person as the part or person rotates relative to the radiography system (e.g. an X-ray source and imaging system). These images are known as a "set of projections". The CT system then uses the projections and creates a 3D data set known as a "volume data set". The creation of the 3D data set is known as "reconstruction". This data set can be viewed in many ways, but primarily thin sections of the data set are used to create images known as "slices".

One purpose of a CT system is to provide slices of an object or specimen, such as providing slices of a patient's brain as part of a medical diagnostic procedure. Another use of a CT system is to provide slices of a manufactured component or system for quality control purposes.

The object can be rotated using a rotatable platform while such object is being imaged. One part of a typical image reconstruction process depends on the center of rotation being aligned with respect to the center of the source of radiation (known as the "spot") and the center of the detector. Portions of the resulting reconstructed image may be difficult to reconstruct properly due to various reasons, including an undesirable offset in the center of rotation. Blurring of features of the object will then occur during reconstruction.

In view of the foregoing, improved center offset calibration techniques for image analysis for CT systems would be beneficial.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of determining a center offset distance for computed tomography (CT) imaging is disclosed. A specimen is provided on a support that is positioned between an emission source for outputting radiation towards the specimen while the specimen rotates with respect to a detector for receiving radiation that has passed through the specimen. Projection data is collected from emissions received at the detector for multiple rotational positions of the specimen. A sinogram image is generated based on the projection data. The sinogram image is divided into image portions, which are superimposed and iteratively moved relative to each other by a relative offset so that a superimposed image peak in such superimposed image portions has a maximized height. A center offset distance for the sinogram image is defined as a relative offset between the superimposed image portions that results in the maximized height. If the center offset distance is zero, the superimposed image portions will be superimposed so that their edges are aligned to result in the maximized height. A specimen image is reconstructed using the defined center offset distance.

In a specific implementation, dividing the sinogram image comprises cutting the sinogram image into a top half and a bottom half. In a further aspect, iteratively moving the image portions in a superimposed manner relative to each other includes (i) flipping a first sinogram portion of the top and bottom halves horizontally relative to a second sinogram portion of the top and bottom halves, (ii) superimposing the flipped first sinogram portion of the top or bottom half together with the second sinogram portion of the top and bottom halves so as to combine grayscale values for each superimposed position, (iii) measuring and storing a height of an image peak in the grayscale values, along with a relative offset between the superimposed flipped first sinogram portion and second sinogram portion, and (iv) moving the superimposed flipped first sinogram portion relative to the second sinogram portion and repeating the operation of measuring until a largest peak has been found. In a further aspect, a dividing line between the top and bottom half is perpendicular to a center line of the sinogram that corresponds to a center of the detector.

In another embodiment, the relative offset and movement between the superimposed image portions corresponds to a fraction of a pixel of the detector. In another aspect, the relative offset and movement between the superimposed image portions corresponds to a whole pixel of the detector. In another example, the image portions are moved in a direction that is perpendicular to a center line of the sinogram that corresponds to a center of the detector. In another implementation, reconstructing the image of the specimen includes entering the defined center offset distance, including its polarity, into geometry data for the sinogram image. In a further aspect, the defined center offset distance is only entered into the geometry data for the sinogram image if the defined center offset distance differs from an offset determined by native software of the CT system by more than a predefined limit; and otherwise, using the offset that is determined by native software of the CT system. In an alternative embodiment, the sinogram image is preprocessed to form an outline image around the sinogram peak area portions before the image portions are iteratively moved.

In an alternative embodiment, the invention pertains to a computed tomography (CT) system. The CT system includes a detector, an emission source for outputting radiation towards a specimen, and a support for placement of the specimen and that is rotatable and positioned between the emission source while the specimen rotates with respect to such detector. The detector is arranged to receive radiation that has passed through the specimen. The CT system also includes a processor and memory that are configured for performing one or more of the above-described method operations.

These and other aspects of the invention are described further below with reference to the Figures.

BRIEF DESCRIPTION OF THE DRAWINGS

FIG. 1 is a diagrammatic representation of a computed tomography (CT) imaging system.

FIGS. 9A-9H illustrate a process for determining center offset distance in accordance with one embodiment of the present invention.

DETAILED DESCRIPTION OF EXAMPLE EMBODIMENTS

Figure 2A:
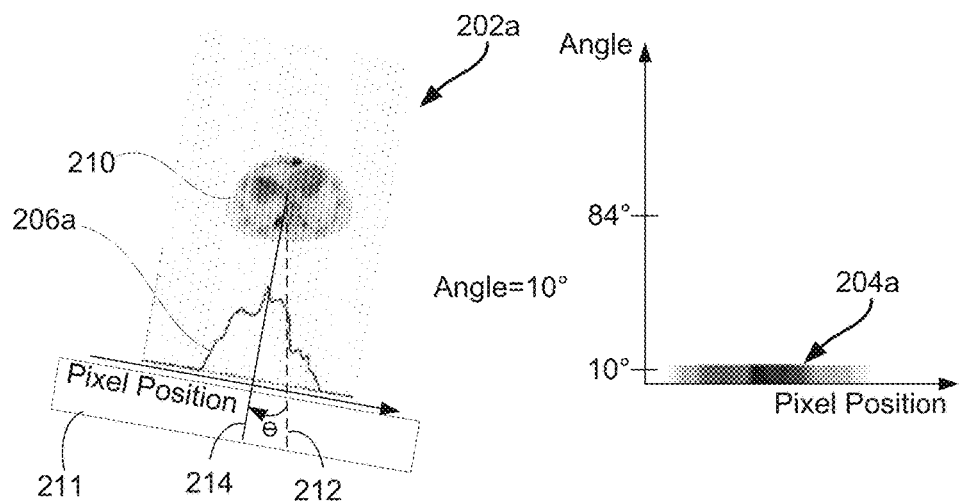
FIG. 2A through 2D are diagrammatic illustrations of a process for reconstructing an image based on the projections obtained at different angles of a sample with respect to a detector.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Introduction

FIG. 1 is a diagrammatic representation of a CT imaging system 100. As shown, the CT system 100 may include a radiation source 102 for directing penetrating radiation towards a specimen 108. For instance, the radiation source 102 may take the form of an X-ray tube. The radiation emitted by the radiation source may also be shaped so as to be collimated into a fan or rays. The system 100 also includes a support 104 upon which the specimen is placed. The support 104 also may take the form of movement mechanism (e.g., turn table) for rotating the specimen 108, for example, around rotational axis 106. The support and specimen may be rotated respect to the detector and/or the detector rotated relative to the specimen by any suitable mechanism so as to scan different angles of the specimen. For example, a motor mechanism may be utilized to rotate the support. The rays pass through different portions of the specimen 108 as it rotates. The radiation becomes attenuated due to different densities of the material of the specimen through which the radiation passes.

The radiation passes through the rotating specimen; is attenuated in various amounts by the object; and then impinges on a radiation detector 112. The radiation detector 112 may take any suitable form that receives radiation, such as X-rays, passing through an object and generates signals or images corresponding to emission attenuation for particular positions in the specimen. For instance, a gamma camera having a crystal face may be positioned to receive the X-rays that pass through the specimen and impinge on such camera.

The images created by the attenuated radiation at different angles (one projection per angular position) are pixelated 2D images 110 representing the linear attenuation coefficients of the sample through which the radiation has passed. In one technique, a sinogram image is formed based on the attenuated data that is collected at the different angles of rotation. The sinogram image is then used during reconstruction.

Any suitable system may be utilized to implement embodiments of the present invention. For example, the CT system 100 of FIG. 1 may be used. The CT imaging system 100 may also include one or more controllers (e.g., 150) for controlling the components of the system 100 and processing projection data in accordance with techniques of the present invention. The projection data captured by the detectors can be processed by controller 150 or, more generally, by one or more signal processing devices, which may each include an analog-to-digital converter configured to convert analog signals from each sensor into digital signals for processing. The controller 150 typically has one or more processors (150b) coupled to input/output ports, and one or more memories (150a) via appropriate buses or other communication mechanisms.

The controller 150 may also be in the form of a computer system that includes one or more input devices (e.g., a keyboard, mouse, joystick) for providing user input, such as changing focus and other inspection recipe parameters. The controller 150 may also be connected to the support for controlling, for example, a specimen position and connected to other system components for controlling other imaging parameters and configurations of such system components.

The controller 150 may be configured (e.g., with programming instructions) to provide a user interface (e.g., a computer screen) for displaying data, such as projection data, sinogram images, and resulting specimen image. The controller 150 may be configured to analyze such images for defects. The controller 150 may be configured (e.g., with programming instructions) to provide a user interface (e.g., on a computer screen) for displaying data, images, and analysis results. In certain embodiments, the controller 150 is configured to carry out inspection techniques detailed herein.

Because such information and program instructions may be implemented on a specially configured computer system, such a system includes program instructions/computer code for performing various operations described herein that can be stored on a computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

FIGS. 2A through 2D are diagrammatic illustrations of a general process for reconstructing an image based on the projections obtained at different angles of a sample with respect to a detector. Although a heavy industrial component would typically be rotated with respect to the detector, this example shows the detector rotating around the sample, which is equivalent to rotating the object, so as to simplify the drawings.

Figure 2B:
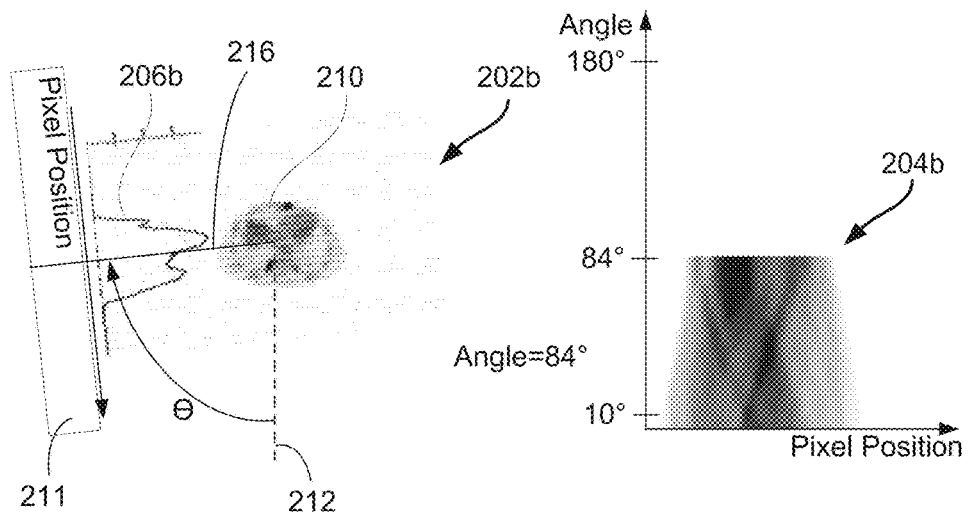
Figure 2C:
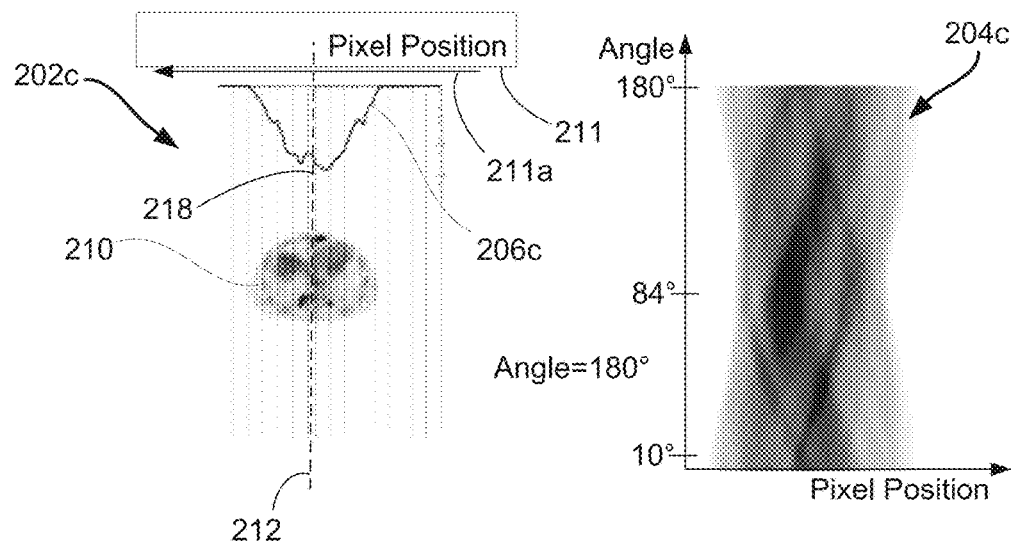

In general, emission data is collected at the detector 211 as it rotates with respect to sample 210. The emission data is used to construct a 2D sinogram (e.g., 204a-204c), which represents the emission data as a function of rotation angle θ. As shown in FIG. 2A, the detector 211 and sample 210 have a first orientation 202a with respect to each other. More specifically, the rotation angle θ is measured with respect to a first reference axis 212. In FIG. 2A, the detector 211 has moved from an angle of zero (if aligned with axis 212) to a second position 214 having an angle θ equal to 10°. At this angle, emission data intensity values are shown in graph 206a. The corresponding sinogram 204a is shown as partially constructed for the emission values for each detector pixel position for the angles between 0 and 10°. FIG. 2B illustrates a second orientation 202b for the detector 211 and sample at an angle θ equal to 84° (between 216 and 212) with a corresponding emissions 206b and sinogram 204b. FIG. 2C illustrates a second orientation 202c for the detector 211 and sample at an angle θ equal to 180° (between 218 and 212) with a corresponding emissions 206c and sinogram 204c.

Figure 2D:
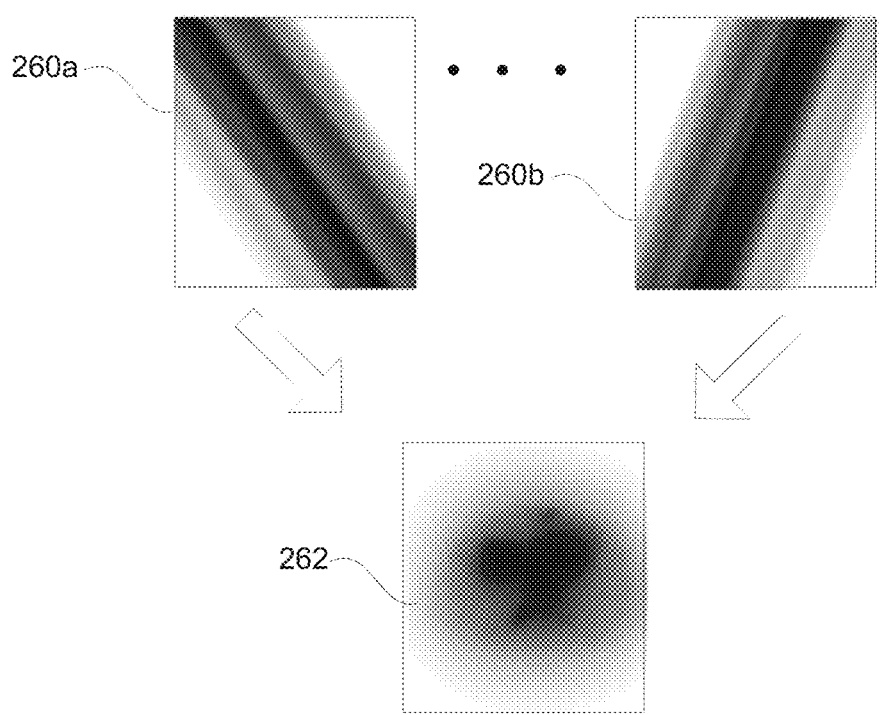

The data from the sinogram can then be back projected to obtain a reconstructed image. FIG. 2D illustrates how the sinogram data from all of the angles is back projected into the same image space. In general, back projection is a process in which the measured profile associated with each specific angle of acquisition is "smeared" across the image space to form a back projected image. For instance, the sinogram data for angle of 45° may be back projected to form back projected image 260a, while the sinogram data for angle 120° is used to form back projected image 206b. The sinogram data at all the angles (only two angles are illustrated) are used to form back projected images that are overlaid to generate the final reconstructed image 262.

For an image reconstruction based on a sinogram to effectively produce an accurate image, the center of the image is expected to lie on the line between the radiation center (spot) and a vertical line centered on the horizontal midpoint of the detector. When the rotational axis is not centered, the sinogram image (the overlay image of all images) turns out blurry and cannot be used to identify key features for the resulting reconstructed image.

Figure 3:
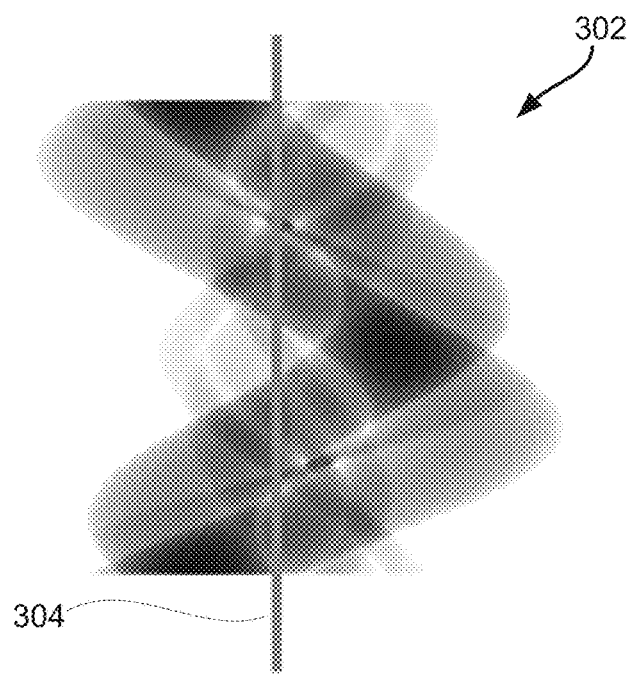
FIG. 3 illustrates a balancing process for determining a center line correction from a sinogram.

FIG. 3 illustrates a balancing process for determining a center line correction 304 from the sinogram 302. This line of balance 304 is typically found by adding the grayscale values of the pixels on each side of the line to obtain a grayscale value total for each side, and then moving the line until each side has an equal grayscale value total. However, this balancing technique is not reliable due to various issues, e.g., variable output from the X-ray tubes.

Figure 4A:
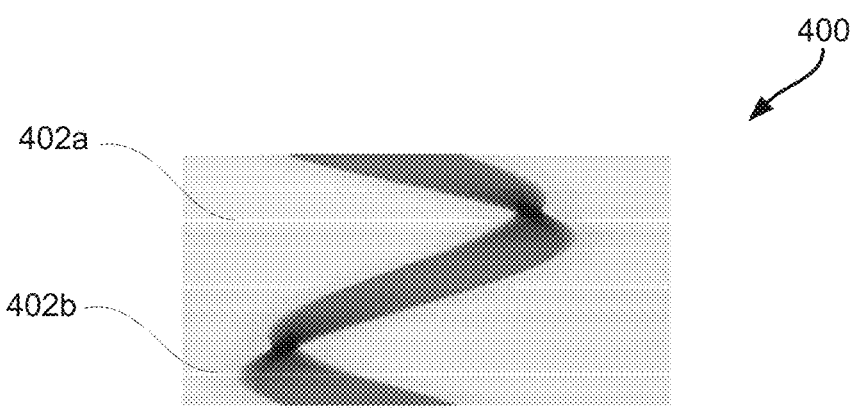
FIG. 4A illustrates variable x-ray tube output that results in white lines across the sinogram image.
Figure 4B:
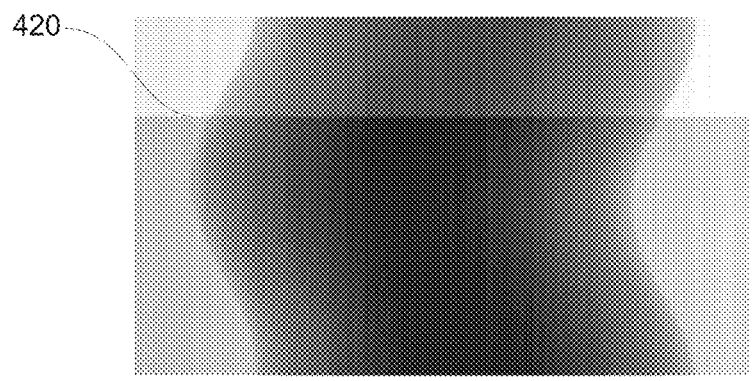
FIG. 4B also illustrates another example inconsistent grayscale values in the sinogram that is caused by a common tube output variation.

FIG. 4A illustrates variable x-ray tube output that results in white lines, such as 402a and 402b, across the sinogram image 400. FIG. 4B also illustrates another example of inconsistent grayscale values in the sinogram that are caused by a common tube output variation. As shown, the sinogram image contains a horizontal line 420 caused by variable x-ray tube output.

Figure 4C:
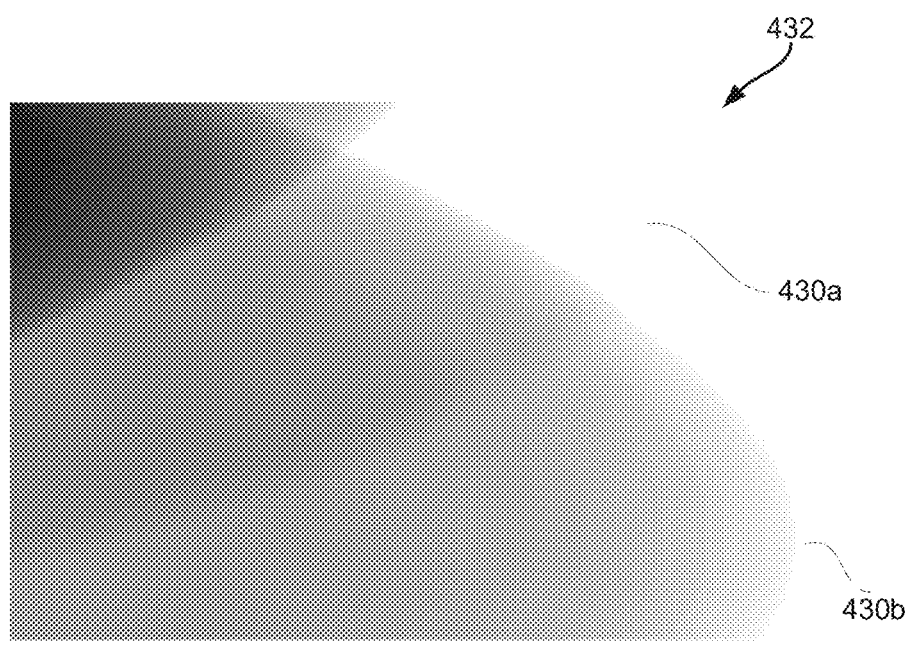
FIG. 4C illustrates two peaks on the right side of sinogram for determining a center line for such sinogram.
Figure 4D:
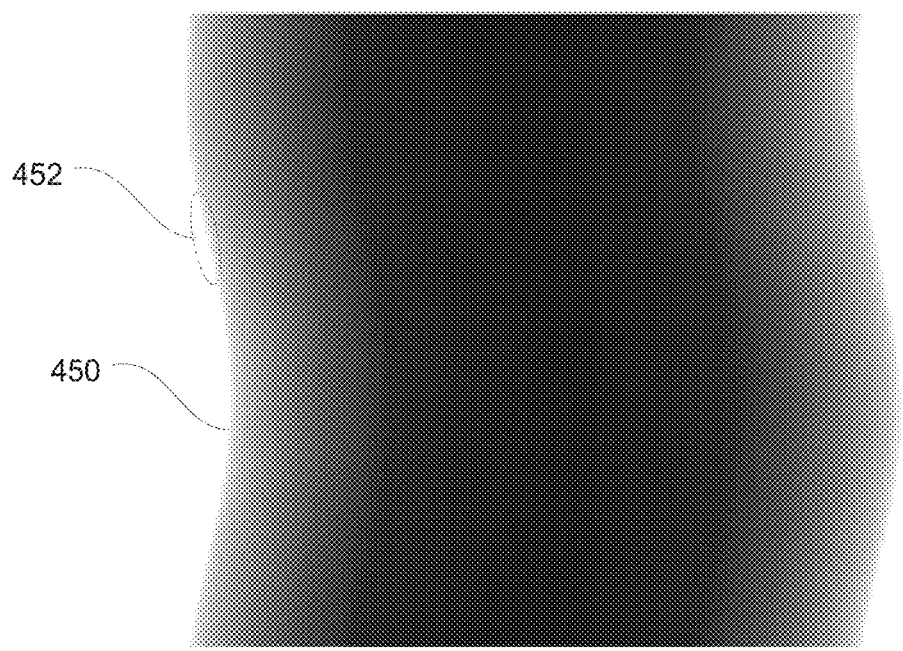
FIG. 4D illustrates another form of sinogram edges that are not defined well for determining a center line for such sinogram.

There are numerous issues with a typical sinogram that may make it difficult to determine the center line. For instance, the software for finding a line of balance may look for the peaks of the sinogram to determine the center line as being positioned between peaks on each side of the sinogram. FIG. 4C illustrates two peaks 430a and 430b on the right side of sinogram 432 for determining a center line for such sinogram. As can be seen, these peaks are not very defined and their positions would be difficult to determine accurately and, hence, may likely cause an inaccurate center line determination. FIG. 4D illustrates another form of sinogram edges that are not defined well for determining a center line for such sinogram. In this example, the sinogram edge 450 can be seen to be formed from a gradual fade from the imaged structure's dark intensity to the background field's white intensity (e.g., region 452).

Figure 5A:
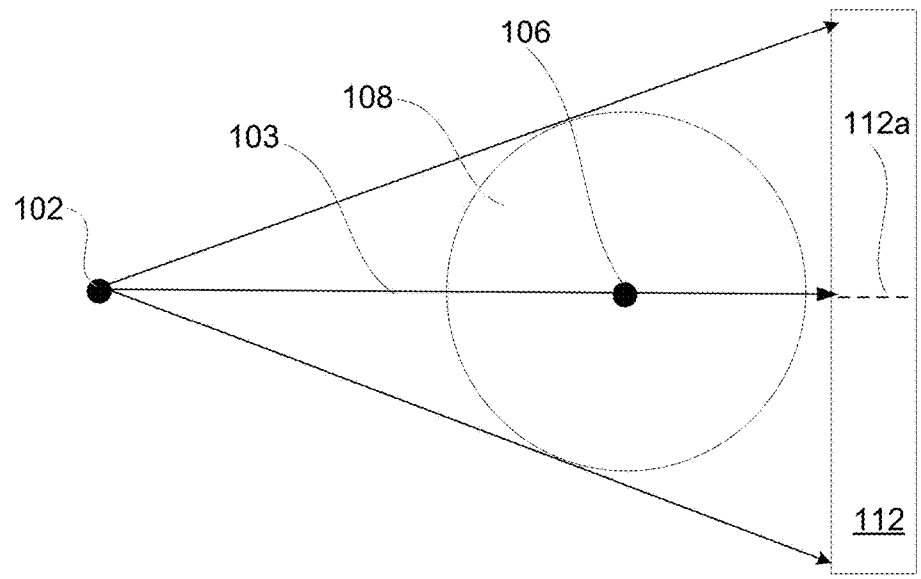
FIG. 5A illustrates rotation of the specimen when perfectly centered.

FIG. 5A illustrates rotation of the specimen table 108 when it is perfectly centered with respect to the center of radiation (e.g., 102). As shown, the axis of rotation 106 of the specimen 108 is centered so that a center line 103 from the center spot of the origin of radiation 102 runs through both the axis of rotation 106 and the center of the detector face (112a).

Under various conditions, the sample may be off center in its rotation relative to the detected projections, and this off-centered aspect of the rotating sample support table detrimentally affects the reconstructed image results. For example, the mechanical moving parts of the rotating support on which the sample is placed may be slightly out of alignment so that the center of rotation is offset from its expected position. An off-center amount that is even as low as $5/1000^{th}$ of an inch may eliminate usefulness of the CT scan data.

Figure 5B:
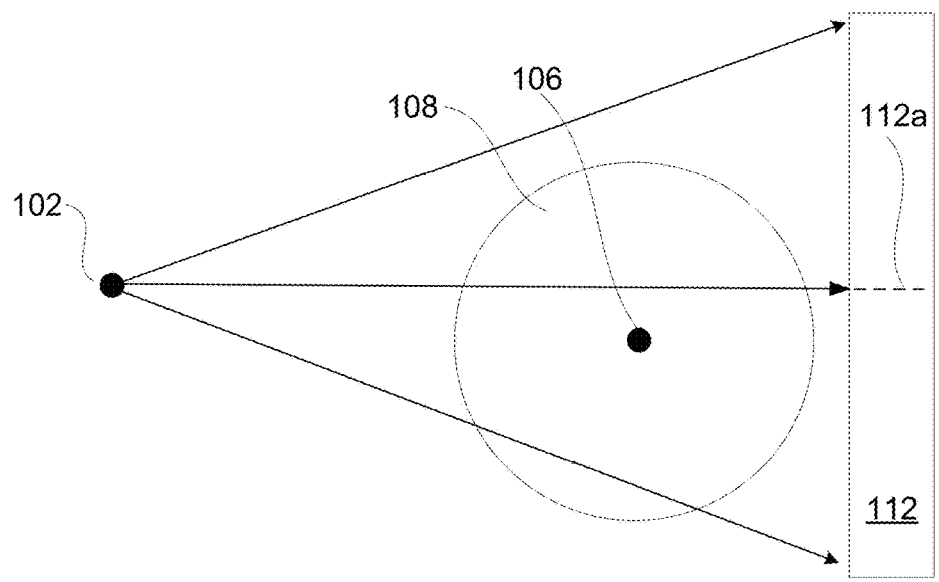
FIG. 5B illustrates rotation of the specimen when off centered.
Figure 5C:
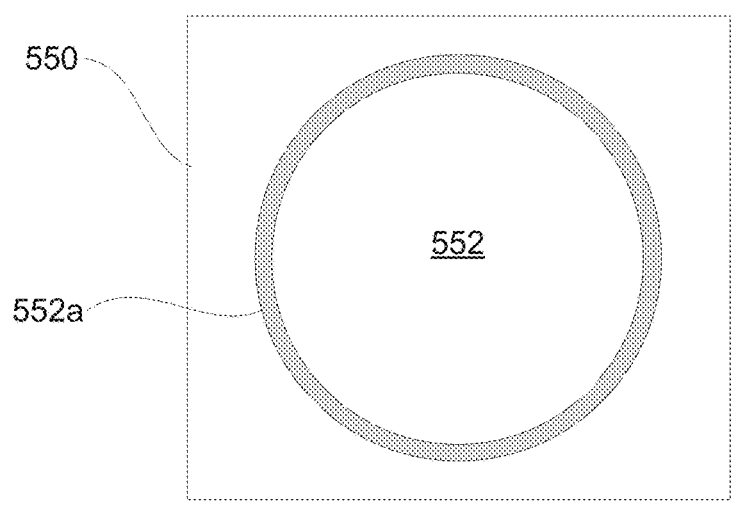
FIG. 5C is a diagrammatic representation of the imaging results from an off-center specimen in the form of an aluminum disk.

FIG. 5B illustrates rotation of the specimen when it is off center with respect to the focal point of the rays of attenuated radiation. As shown, the sample table 108 has a center of rotation 106 that is off center from the center of the radiation spot 103 and the detector center 112a. FIG. 5C is a diagrammatic representation of the imaging results for an aluminum disk sample.

As illustrated, the image 550 includes a pixelated specimen image 552 having a noticeably blurred edge 552a due to the off-center portion of the specimen. When an object is not centered, the sinogram image (the overlay image of all images) turns out blurry and cannot be used to readily identify key features (e.g., along the specimen edge). Additionally, magnification increases the effect of blurriness so that analysis of the image becomes increasingly more difficult. A defect may be difficult to see anywhere on the image.

Figure 6:
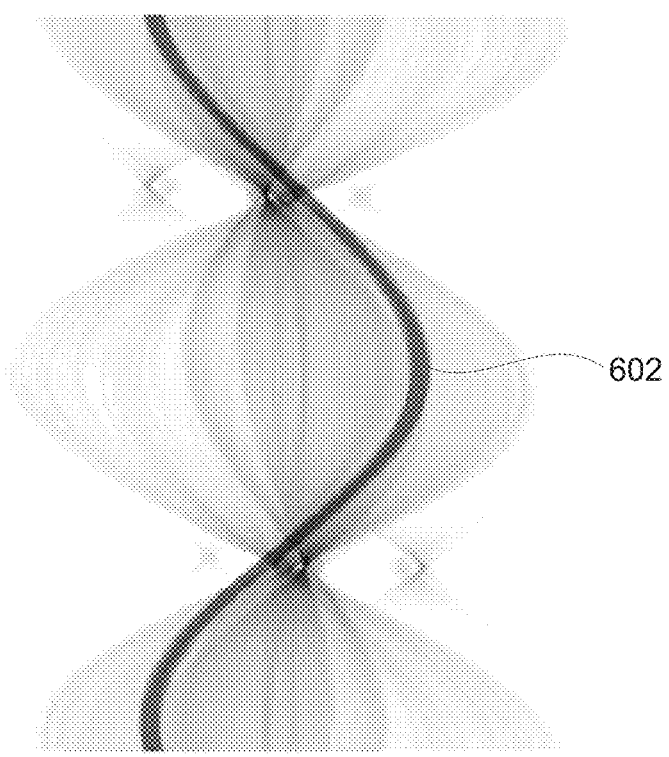
FIG. 6 illustrates a sinogram image that results from scanning a low density wire that has been added to a scanned round object.

The projections (images) can be properly aligned if a system/engineer knows the offset amount of the object being scanned. However, determining which aspects of the image (e.g., sinogram image) are due to offset vs. geometry is difficult for both computers and people. In one solution, a wire is attached to a low density object that is being imaged. The wire theoretically shows up in the sinogram to facilitate determination of the center line of such sinogram. However, as shown in FIG. 6, there is a gradual fading from gray into white along the imaged wire's edge (e.g., 602) in the sinogram image. In certain cases, the high density wire will lower the image quality because the lower density object being scanned will "wash-out" or fade in the final slice image because the range of grayscale-values for the object will be greatly reduced due to the bandwidth of the image being consumed by the need to display the high density image.

Figure 7A:
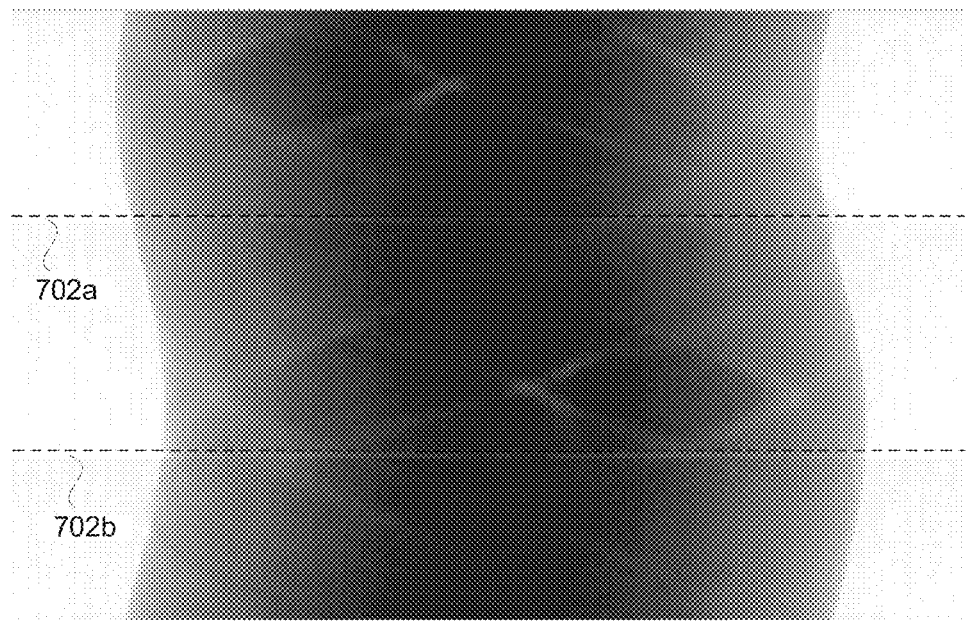
FIG. 7A represents a sinogram image for a composite disk.
Figure 7B:
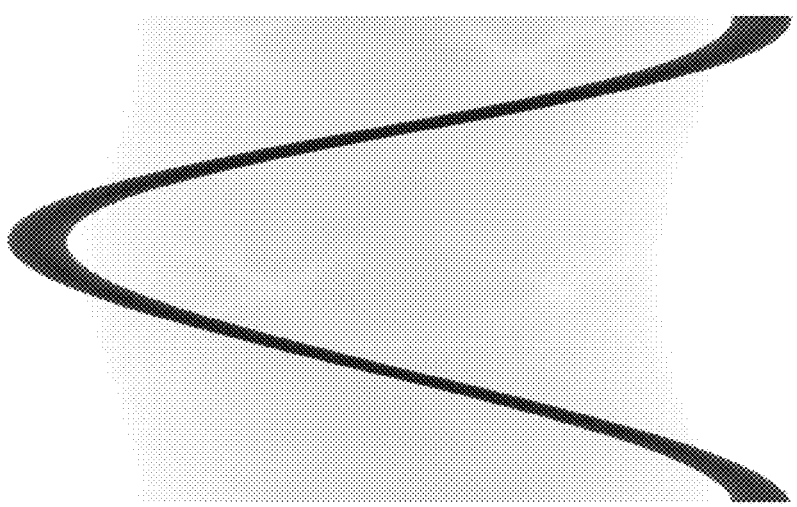
FIG. 7B illustrates a sinogram image of the composite disk of FIG. 7A with the addition of a wire object.

FIG. 7A represents a sinogram image for a composite (e.g. fiberglass) disk or "puck." The resulting sinogram image shows part features, which are to be analyzed for defects, but may be difficult to distinguish within the disk's resulting sinogram image. One issue that may make it difficult to reconstruct an accurate image is the white lines 702a and 702b due to the tube variation, which may cause inaccurate determination of the center line for such sinogram. Addition of a wire object around the puck of FIG. 7A does not provide an acceptable solution as seen in the resulting sinogram of FIG. 7B. As illustrated, the wire causes the object's features to fade and become indistinguishable due to contrast issues.

Figure 8A:
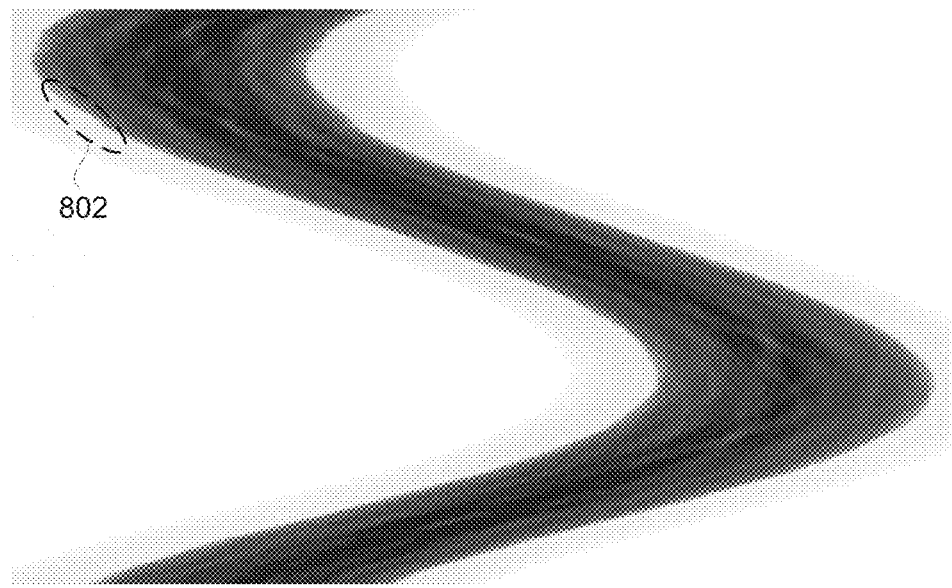
FIG. 8A illustrates rough edges in a sinogram image.
Figure 8B:
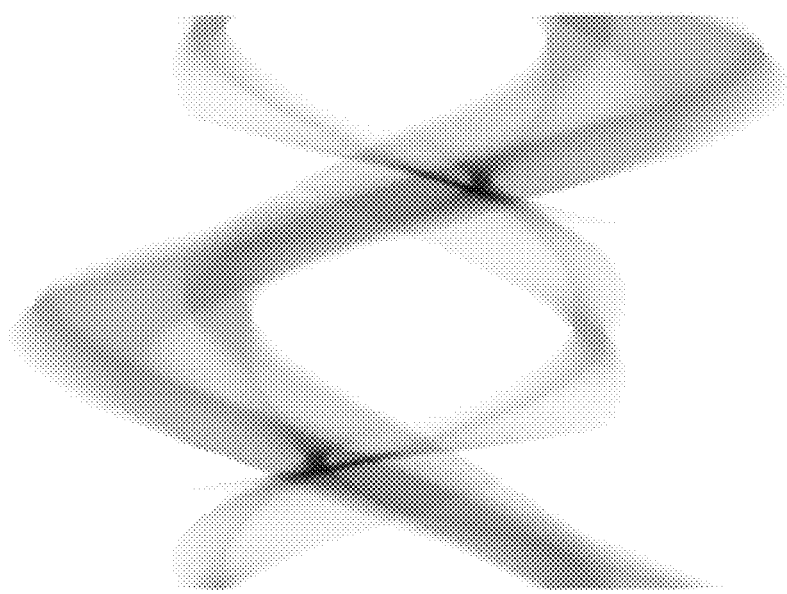
FIG. 8B illustrates a sinogram having minimal contrast.

There are numerous issues that can adversely affect the sinogram image. FIG. 8A illustrates rough edges (e.g., region 802) in a sinogram image. The positions of these rough edges would be difficult to use to calculate the center line for such sinogram. FIG. 8B illustrates a sinogram having minimal contrast, which also makes it difficult to determine a center line for such sinogram.

Figure 8C:
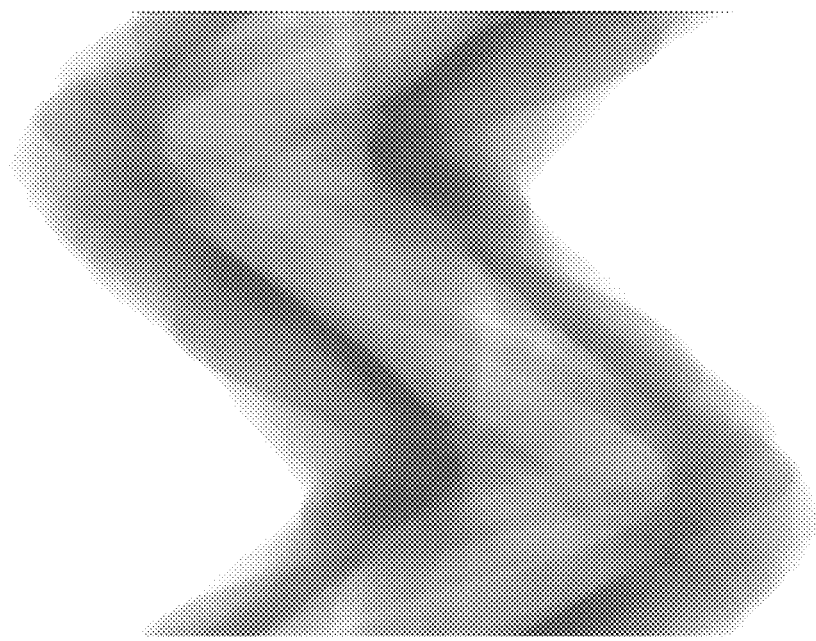
FIG. 8C illustrates another sinogram image for which it is difficult to determine a center line due to sinogram edges that are not clearly defined.
Figure 8D:
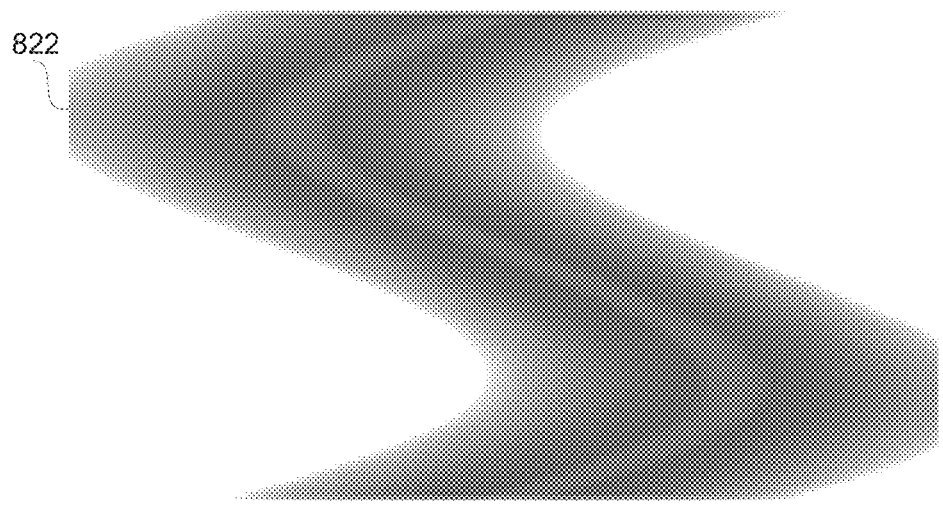
FIG. 8D illustrates a sinogram that is generated when the part being scanned moves out of range of the detector.

FIG. 8C illustrates another sinogram image for which it is difficult to determine a center line due to sinogram edges that are not clearly defined. FIG. 8D illustrates a sinogram that is generated when the part being scanned moves out of range of the detector, resulting in part of the object image being cut off (e.g., region 822). The resulting sinogram is not balanced due to cutoff edges, making it difficult to determine an accurate center line.

Center Offset Calibration Embodiments

Certain embodiments of the present invention provide mechanisms for facilitating an accurate determination of the center offset and allowing the use of CT scans on parts with varying symmetry, thickness, features and densities. In certain embodiments, center offset calibration includes analysis of the symmetry of the sinogram image without requiring the addition of any hardware for center offset correction, while being more immune to image noise and dose rate variation, as compared with a technique that simply balances the grayscale values on each side of a center line of the sinogram image. In general, the sinogram image may be analyzed line by line to find the CT system's variation from center in a unique way that achieves robust results for center offset determinations.

Figure 10A:
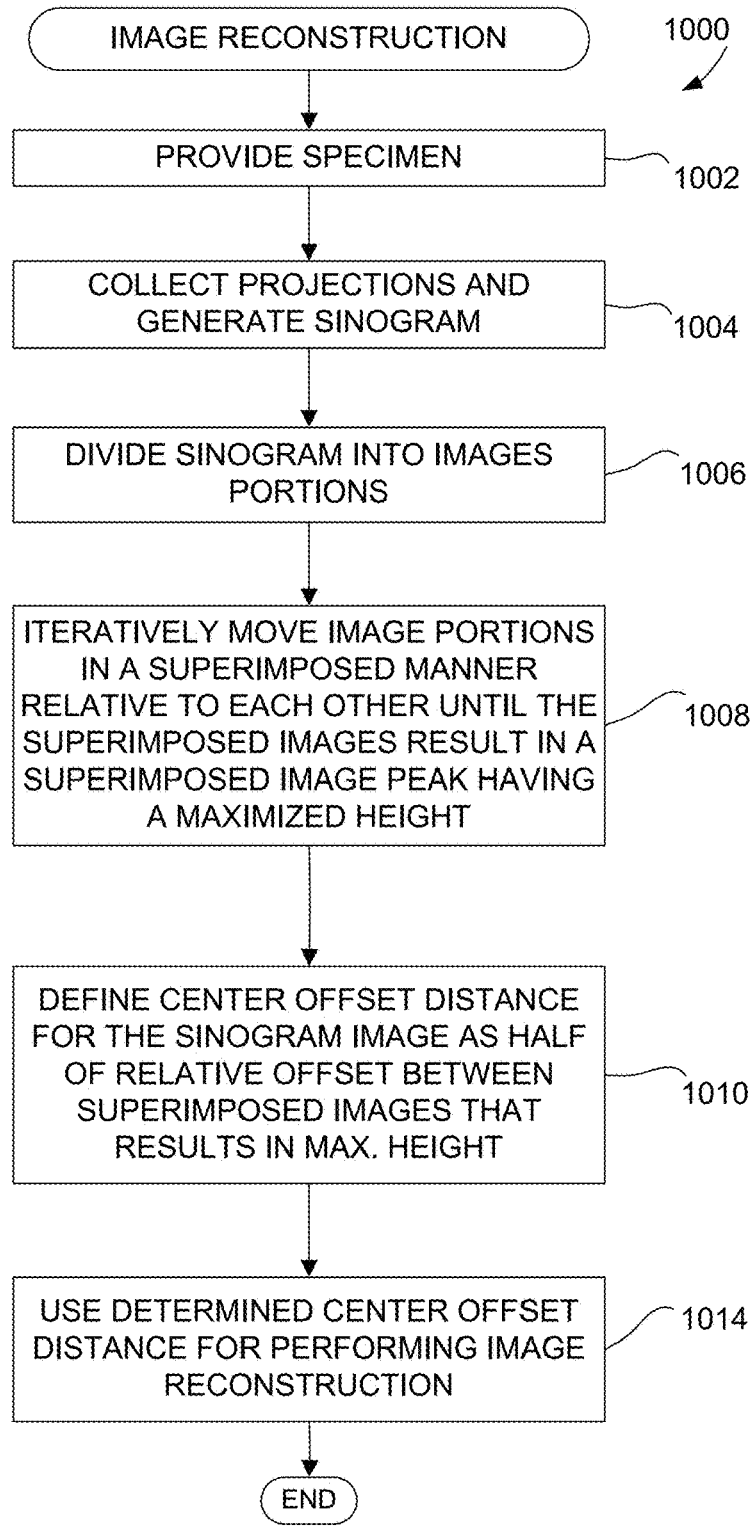
FIG. 10A is a flowchart illustrating a procedure for image reconstruction for a CT scan in accordance with one embodiment of the present invention.

Any technique for image reconstruction using a center offset that was determined by analysis of the sinogram image symmetry may be utilized. FIG. 10A is a flowchart illustrating a procedure for image reconstruction for a CT scan 1000 in accordance with one embodiment of the present invention. As shown, a specimen may initially be provided in operation 1002. The specimen may be any suitable object, such as manufactured components. The specimen may be placed on a rotating platform or table such that the specimen is placed between the emission source and the detector. Preferably, the specimen is positioned so the detector center is aligned with the focus point of the emission and center of rotation. However, this arrangement is often difficult to accurately set up or maintain as noted above.

After the specimen is set up, the projections of the specimen may then be collected and a sinogram image generated in operation 1004. In one embodiment, the specimen is rotated relative to a detector. In alternative embodiments, the detector is rotated relative to the specimen. The scan may be any suitable type of imaging that requires multiple projections and image reconstruction. Example scanning technologies include CT, any type of positron emission, any single positron computed tomography (SPEC), etc. The sinogram may generally be created based on the collected projection data. Example techniques for forming a sinogram based on projections of collected emissions at different rotational angles are further described herein.

In one embodiment, the sinogram is then divided into multiple image portions in operation 1006. These image portions are selected and sized so that if the actual center offset distance is zero, the superimposed image portions can be superimposed so that their edges are aligned to result in a maximized height for a superimposed peak in the superimposed image. That is, the image portions can be orientated with respect to each other in a superimposed manner so that the image portions would perfectly align if the center offset is zero. If there is an actual non-zero offset, on the other hand, the image portions are then iteratively moved in a superimposed manner until the superimposed images portions result in a superimposed image peak having a maximized height in operation 1008.

The center offset distance can then be defined for the sinogram image as half the relative offset between the superimposed image that results in the maximum peak height in operation 1010. This determined center offset distance may then be used for performing an image reconstruction in operation 1014 as further described below. The procedure then ends. However, this process 1000 may be repeated for any number of sub-portions and positions of the specimen.

Figure 9E:
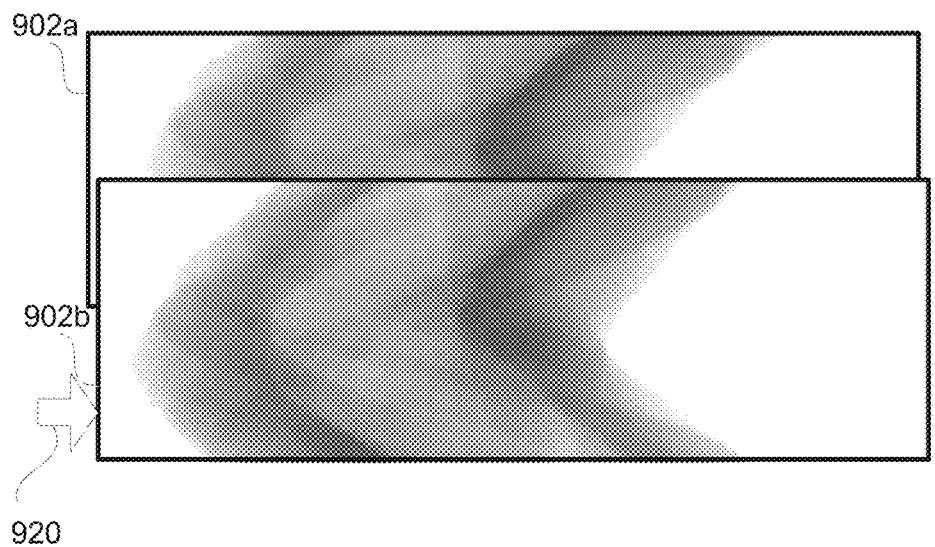
Figure 9F:
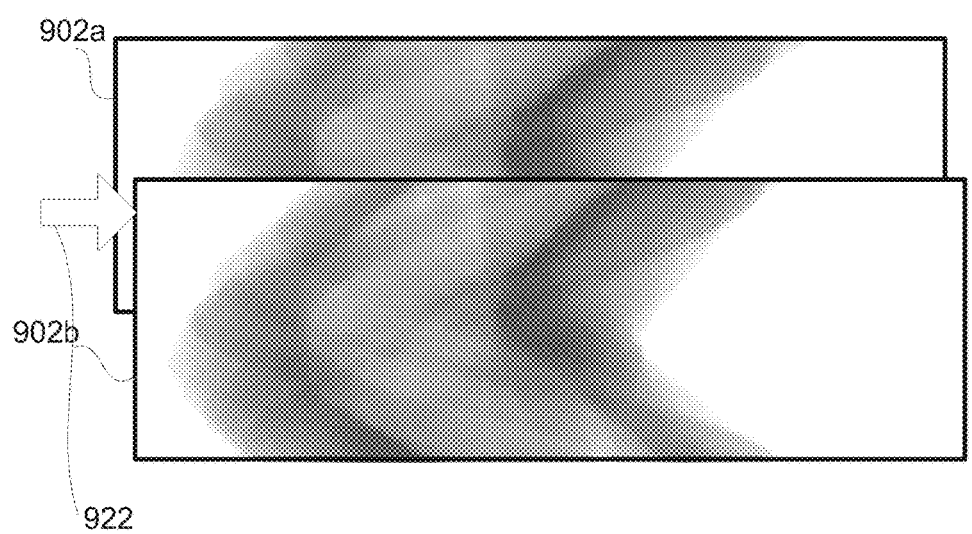
Figure 9G:
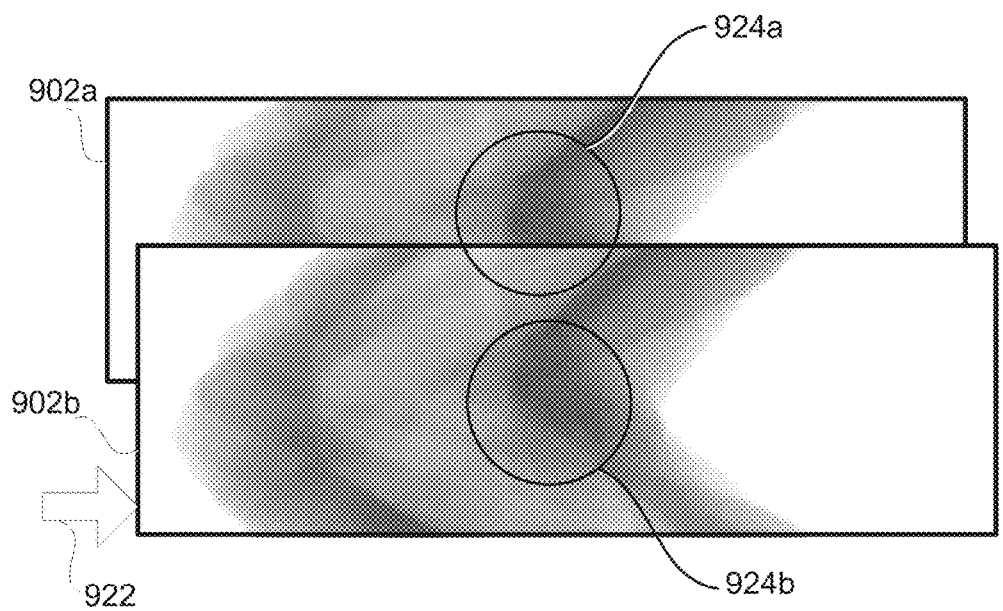

Any suitable technique may be used to determine a center offset for a rotating sample undergoing a CT scan based on analysis of superimposed portions of the sinogram image. FIGS. 9A-9H illustrate a specific process for determining center offset distance in accordance with one embodiment of the present invention. FIG. 10B is a flowchart illustrating a procedure 1050 for determining center offset distance in accordance with a specific implementation of the present invention. In this illustrated example, the sinogram is divided and manipulated in a specific manner to determine the center offset distance for the sinogram image. As shown, the sinogram is cut in half, forming top and bottom halves in operation 1056. FIG. 9A illustrates an example sinogram 902, while FIG. 9B illustrates the same sinogram cut into a top half 902a and a bottom half 902b. The cutting line (904 in FIG. 9A) is in the middle of the image, so that each new image represents the projections taken through 180 degrees.

Referring back to FIG. 10B, the bottom half is then flipped horizontally (around a vertical axis) in operation 1058. FIG. 9C shows the result of horizontally flipping the bottom half 902b. The top and flipped bottom halves may then be superimposed together, combining grayscale values for each position in operation 1059. FIG. 9D represents the bottom half 902b superimposed onto the top half 902a although the full superposition is not shown so as to not obscure the top half. In other words, the bottom half would be superimposed fully over the top half so that the edges of each half matched (or the one of the halves perfectly covered the other half).

The height of any of the peaks, along with a relative pixel position, are then measured and stored in operation 1060. For the first superimposition, the initial relative pixel position may be defined as 0,0. The height of each peak may be determined in any suitable manner. In one embodiment, the two image halves are combined cell-by-cell, and the grayscale values are added together for each matching position. The overlaid sinogram halves may be divided into positions that correspond to particular overlaid pixel and angle positions, and the grayscale value of each overlaid pixel and angle position in the superimposed halves are added together to form a superimposed grayscale value for each superimposed pixel position.

It may then be determined whether the largest peak has been found in operation 1061. For example, it is determined whether this current overlaid or superimposed relative position results in the highest peak in a histogram as described further herein. Since this is the first superimposition position, one cannot yet determine whether this position results in the largest peak. Accordingly, the top is then moved relative to the bottom by an incremented pixel position in operation 1062. For instance, the bottom half is moved horizontally by one pixel (in direction 920 as shown in FIG. 9E).

A pixel has a width that represents the width of the detector element. Referring to the sinogram 204c of FIG. 2C, each pixel belongs to a particular row of pixels and a particular angle. In the illustrated process of FIG. 10B, the sinogram halves may be moved by a whole or fraction of a pixel.

The operations for measuring and storing the material peak height and determining whether the largest peak has been created from the overlaid or superimposed pixel grayscale values can then be repeated. In the example of FIG. 9E, the relative pixel position +1,0 may then be stored with the measured one or more peak heights. The process may be repeated for all relative superimposed positions or may be repeated so that an overlaid peak grayscale value has been found. For instance, it may be determined that a particular movement resulted in a determination that a previous overlaid peak position's superimposed value is the actual highest value.

The halves continue to be moved relative to each other in an incremental manner to find the tallest material peak. FIG. 9F illustrates the bottom half moved horizontally relative to the top half so as to result in a relative pixel position equal to +2,0. FIG. 9G illustrates a relative pixel position of +3,0 between the top and bottom half. When the superimposition is aligned so that the peaks (e.g., 924a and 924b in FIG. 9G) perfectly match, the darkest peak areas will combine to create the highest material peak.

Figure 9H:
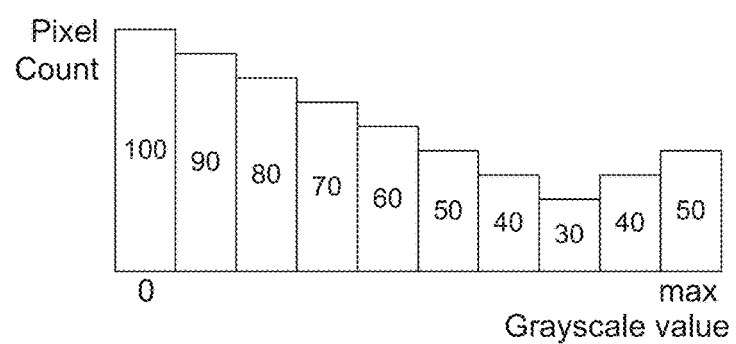
Figure 10B:
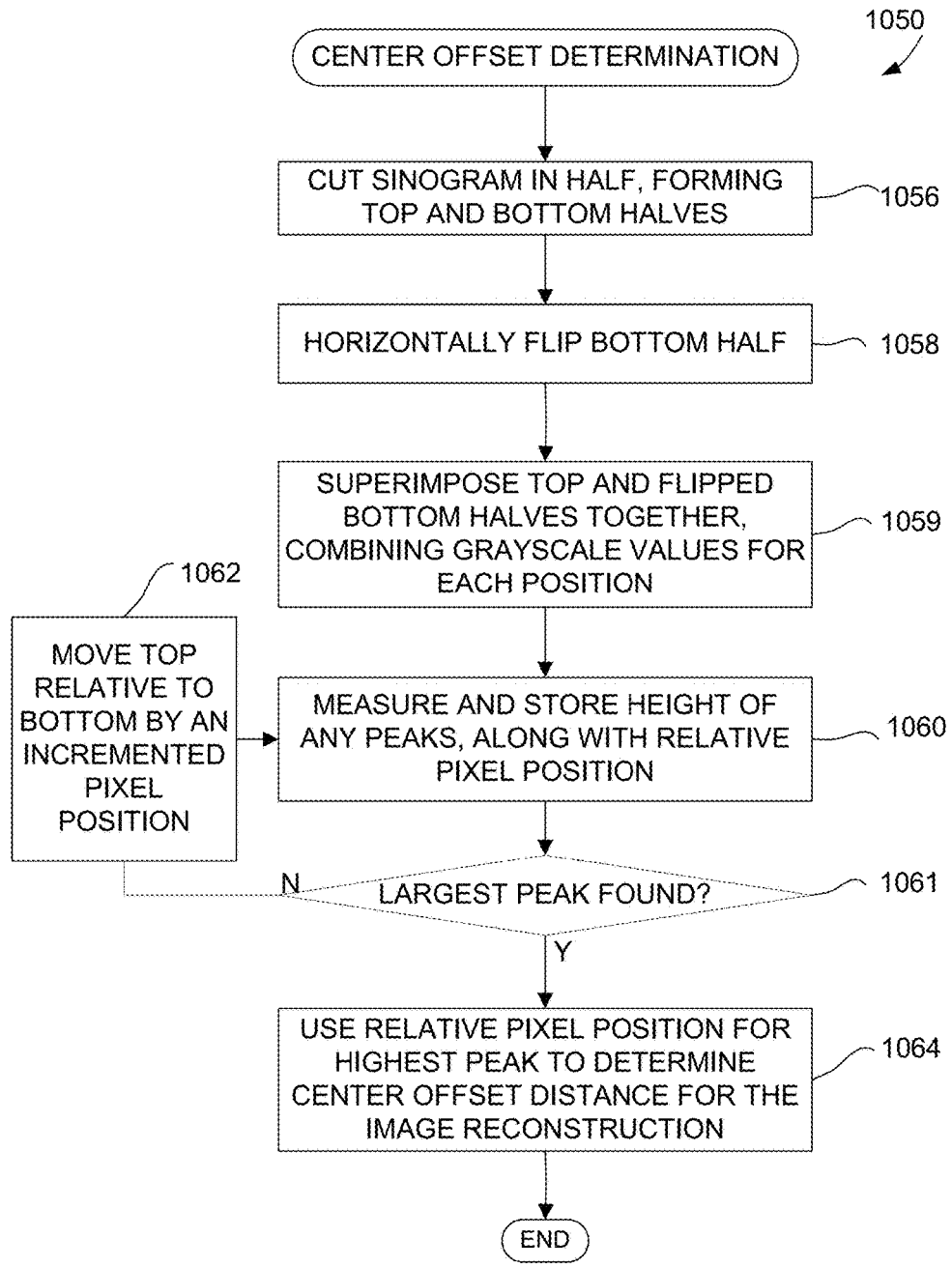
FIG. 10B is a flowchart illustrating a procedure for determining center offset distance in accordance with a specific implementation of the present invention.

In one implementation, a histogram of the combined image may be created from the overlaid sinogram halves as shown in FIG. 9H. The vertical axis of the histogram would be the number of superimposed pixels that have the same superimposed gray-level value. The horizontal axis of the histogram would be the gray-level value from zero to the maximum intensity.

There will be two peaks: one representing air and the other representing the material. The material peak can then be located, and the height of that peak measured. In the illustrated example, there are 50 pixels at the maximum grayscale value (material) and 100 pixels at the 0 grayscale value (air). If a 50 pixel count is the highest achievable count for the maximum grayscale level, then the corresponding relative position of the two sinogram halves may be used to determine the center offset that is to be used in the image reconstruction. Although the material is shown as corresponding to the highest intensity value, it could alternatively correspond to a lowest intensity value in a reverse exposure image. In other embodiment, the highest intensity can correspond to any suitable gray scale value relative to the other grayscale values.

The relative pixel position for the highest peak may be then used to determine the center offset distance for the image reconstruction in operation 1064. More specifically, the number of pixels that one image is moved relative to the other that also results in a highest peak may be used to determine a center offset distance. The number of pixels may be multiplied by the width of the detector element it represents and divided by the magnification. Magnification is the distance from the spot to the detector divided by the distance from the spot to the center of rotation of the specimen table. The reconstruction may then be performed to produce a high quality image with no blurring due to an inaccurate center offset. The procedure then ends. However, this process 1050 may be repeated for any number of sub-portions and positions of the specimen.

Any suitable technique may be used to determine the actual center offset based on the relative pixel position corresponding to the highest peak. The pixel count (or fractional pixel value) for the relative X offset that results in the highest peak may then be converted to a center offset distance using the actual size of the detector and magnification that was used. The actual offset of center of rotation and the center of the detector can be determined based on the detector element size (or pixel size) and accounting for the magnification. This technique yields an offset that is based on multiples of the detector element size (or pixel size). Alternatively, the offset may be determined to be a fraction of the detector element size (or pixel size). Any suitable technique may be used to determine an offset that is a fraction of detector element size. For instance, the relative movement between the superimposed image portions may be performed in fractions or whole pixels.

In an alternative embodiment, it may be determined whether the difference between the image-based offset and the offset calculated by the CT software exceeds a predefined limit. For example, the CT may include software for determining center offset via other techniques that do not split the sinogram in half and superimpose such halves, such as determining the center line of the entire sinogram image by finding a line of balance of the pixel grayscale values. If the difference between offset does not exceed the limit, the reconstruction may be performed with the calculated CT software's offset. If the limit is exceeded, the image-based offset may be entered into the geometry data of the CT software, and the reconstruction is performed using this new offset.

The correction can be created in a stand-alone module (e.g., separated from the native software of the CT system), using software such as Image-J (available from National Institute of Health of Bethesda, Md.) and creating a plug-in for the CT system using Java® language (available from Oracle America Inc. of Sunnyvale, Calif.), by way of example. Alternatively, the correction process can be integrated into the software that is used to control the CT system.

Certain embodiments allow the center offset distance to be determined by analyzing the sinogram while minimizing the impact from certain imaging artifacts, such as lines caused by tube variation. Such lines have minimal effect when image halves are superimposed and grayscale values combined to find a highest peak.

Figure 11:
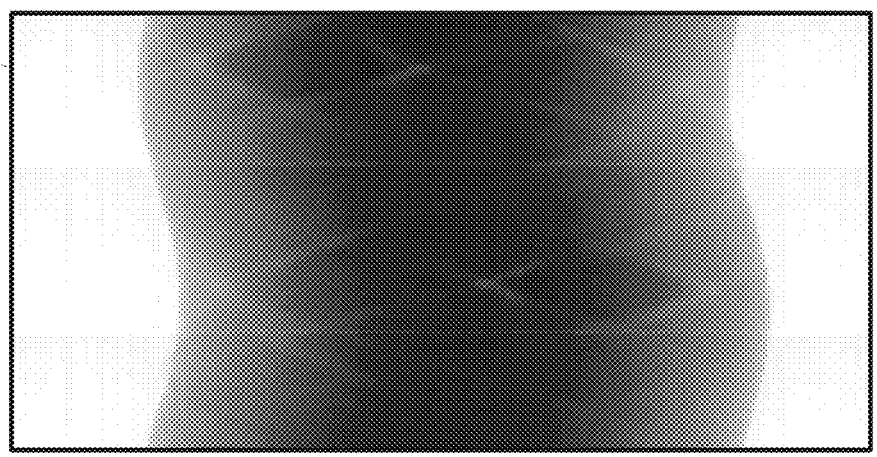
FIG. 11 illustrates a sinogram image that is to be preprocessed in accordance with an alternative embodiment of the present invention.
Figure 12:
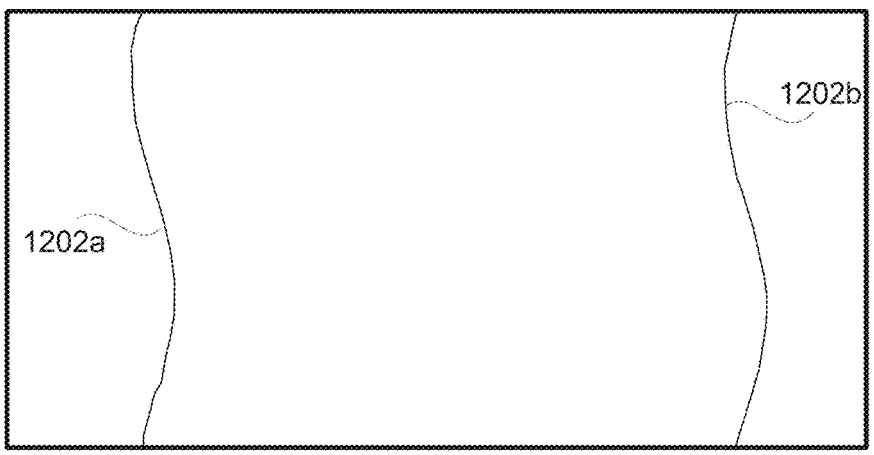
FIG. 12 illustrates a graphed outline of the sinogram image of FIG. 11 in accordance with an alternative embodiment of the present invention.

In an alternative embodiment, the sinogram image may be preprocessed before the image is manipulated for finding a relative pixel position with the highest peak. FIG. 11 illustrates a sinogram image 1100 that is to be pre-processed in accordance with an alternative embodiment of the present invention. In this example, each horizontal line of the image may be graphed from each edge to the first significant increase in grayscale value so as to form two sinusoidally curved lines (1202a and 1202b) from the sinogram as illustrated in FIG. 12. The above-described techniques for finding a center offset distance may then be implemented on such sinogram outline.

Reconstruction Techniques

Any suitable technique for forming sinogram images and reconstructing the specimen image may be implemented. In general, a determined center offset error may be used in the reconstruction process to correct the position of the projections relative to each other. The projections may then be used during reconstruction to create the volume data set for the object being scanned.

Figure 13A:
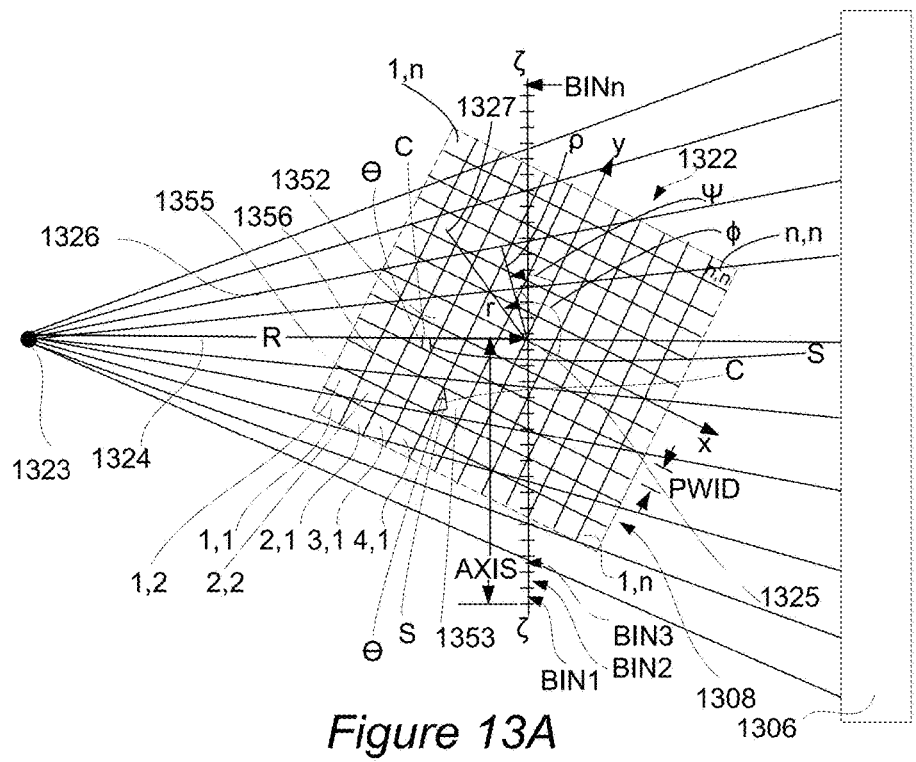
FIG. 13A is a diagrammatic representation of CT system for illustrating image reconstruction.

FIG. 13A is a diagrammatic representation of a CT system for illustrating image reconstruction. While the mechanics for taking the projections in the above-described exemplary equipment can and do vary, the common thread binding all the systems is the creation of a projection space and the taking of a plurality of projections at a plurality of angles around the projection space. Some reconstruction algorithms assume that the projections are all intended to be centered at a center of rotation on the vertical centerline of the detector. In one example, the midline is defined as the projection of the focal point onto the detector (e.g. on a ray through the turn table or specimen support pivot point and normal to the detector). It will be appreciated that in practice, the projection may not have a centerline that aligns with the turntable pivot point and the center of the spot of origin of the radiation rays.

Turning again to FIG. 13A, the detector 1306 may be a gamma camera having a crystal face, which receives a fan of rays directed through the specimen from the focal spot 1323 for each transaxial slice. The apex 1323 of the fan and its swath are indicated in FIG. 13A. The image space is represented by the pixelized area 1322 which can be conceptualized as disposed between the focal spot and the detector arrangement. In the actual scanning apparatus, the image space is occupied by the specimen being scanned from which a set of projections is formed. The geometry of FIG. 13A relates the image space to the projections which are collected by the detectors, and after processing, are mapped into the image space to form the reconstructed image.

With respect to the geometry, it is seen that the image space is based on an xy-coordinate system with the origin located at the center of rotation 1325 of the system, a fixed distance R from the focal point. FIG. 13A illustrates a square pixel array with each pixel of width PWID (measured in units of projection bin width implying that the architecture has been scaled so that distance between adjacent detector bins is unity), having an $(x_i, y_j)$ coordinate with i and j ranging from 1 through n, where n is the index of the last element of a row or column of the display as indicated in FIG. 13A. The single projection illustrated in FIG. 13A is taken at an angle θ with respect to the xy coordinate system.

In a system involving parallel beam geometry, all rays in the projection would be parallel to the center ray 1324, simplifying the reconstruction process. However, in the fan beam case illustrated in FIG. 13A, the rays diverge from the focal point 1323 in a fan shaped swath toward the detector. Taking ray 1326 as exemplary, it can be identified in coordinates for parallel beam geometry by the normal ρ drawn from the origin to the ray and the angle ψ formed between the coordinate system and ρ. Similarly, any arbitrary point in the reconstruction space, such as point 1327, can be identified by its polar coordinates (r, φ).

In order to simplify the reconstruction process in a true fan beam system, another coordinate system based on the ζ axis which, as shown in FIG. 13A, is normal to central ray 1324 and intersects the center of rotation. The ζ axis defines a set of projection bins 1 through n, where bin n is the last bin, of unit width whose projection information is derived from the detector cells in accordance with the diverging geometry of the fan. Any ray in the fan can be identified by the coordinates (ζ,θ). Thus, a fan beam projection can be identified by ρ(ζ,θ).

When the coordinates of the projections are remapped from parallel beam to account for the diverging nature of the fan beam, the projection bins must be scaled with a geometric factor. More particularly, examining the geometry shown in FIG. 13A, it can be shown that:

$$\frac{\rho}{R} = \frac{\zeta}{\sqrt{(R^2 + \zeta^2)}} \qquad \text{Equation 1}$$

Rearranging, and relating the differential dρ to the differential dζ yields:

$$d\rho = \frac{R^3}{\sqrt{(R^2 + \zeta^2)^{3/2}}} d\zeta \qquad \text{Equation 2}$$

Thus, a unit change of ρ does not yield a unit change of ζ, but a change weighted by the factor indicated in Equation 2. In fan beam reconstruction algorithms, the projections are appropriately weighted to take account of this geometric factor. However, when the center of rotation of the system is shifted the weighting factors are no longer valid and use of reconstruction procedures may generate artifacts.

Figure 13B:
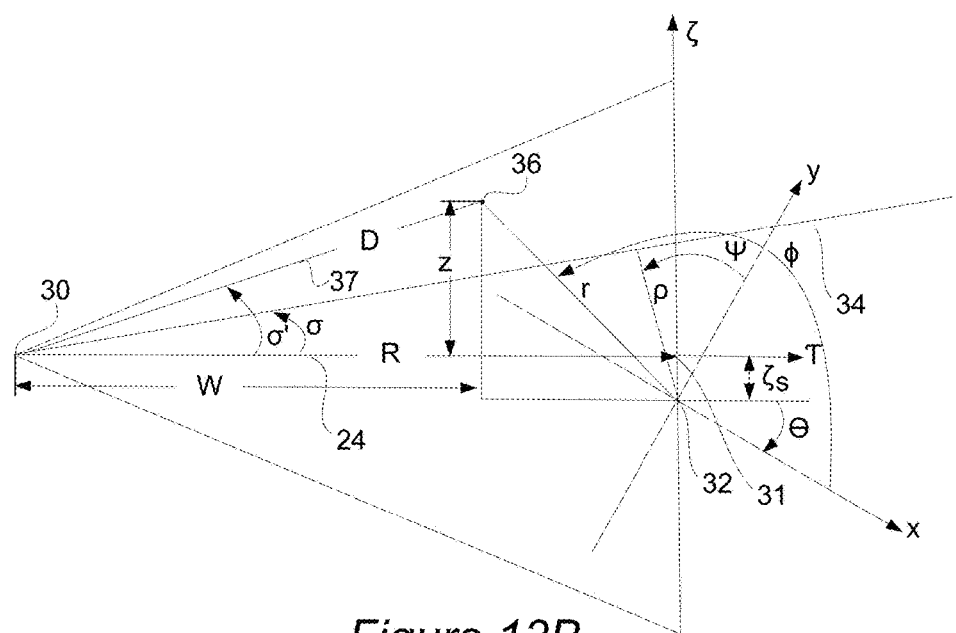
FIG. 13B illustrates the geometry for a fan beam CT system in which the center of rotation is shifted.

Turning now to FIG. 13B, there is shown the geometry for a fan beam CT system in which the center of rotation is shifted. Central ray 24 emanates from the focal point 30 and normal to the detector (not shown), intersecting the ζ axis at a point 31 assumed by conventional fan beam algorithms to be the center of the coordinate system (r,ξ). The distance R is that measured between the focal spot 30 and the point 31. The actual center of rotation may be off-center, shown as point 32 which would then be the actual origin of the rotating xy coordinate system, and is displaced along the ζ axis by a fixed amount $\zeta_s$ representing the shift. A typical ray 34 within the fan is shown as having parallel beam projection coordinates (ρ, ψ). Similarly, any arbitrary point within the reconstructed image can be denoted by its polar coordinates (r, φ).

A term ζ' may be defined as R tan, which is the intersection of the ray 37 with the axis ζ as shown in FIG. 13B. It is also possible considering the trigonometric relationship of the triangles sharing the common angle σ' to define ζ as follows:

$$\zeta' = \frac{R(r\sin(\phi - \theta) + \zeta)}{R + r\cos(\phi + \theta)} \quad \text{Equation 3}$$

This expresses ζ' in terms of the coordinates (r, φ) and variable θ. Radon's inversion formula which integrates over the fan beam projection coordinates (ζ,θ) can be expressed as follows:

$$f(r, \phi) = \frac{1}{4\pi^2} \int_0^{2\pi} g'(\zeta', \theta) \frac{R^2}{(R + r\cos(\phi - \theta))^2} d\theta \quad \text{Equation 4}$$

$$g'(\zeta', \theta) = \lim_{\varepsilon \to 0} \int F_\varepsilon(\zeta - \zeta') p(\zeta, \theta) \left[ \frac{(1 + \zeta \zeta_s / R^2)}{(1 + \zeta^2 / R^2)^{1/2}} \right] d\zeta \quad \text{Equation 5}$$

It will now be appreciated that the foregoing expressions 3, 4 and 5 provide the basis for a procedure whereby projections taken with a shift in the center of rotation are weighted by a factor which takes into account the shift, the weighting factor being:

$$\frac{(1 + \zeta \zeta_s / R^2)}{1 + \zeta^2 / R^2)^{1/2}} \quad \text{Equation 6}$$

The so weighted projections are convolved according to the integral of expression 5, and the modified projections g'(ζ', θ) back projected according to expression 4 to produce the reconstructed image derived from Radon's inversion formula.

In practice, the continuous analytic reconstruction solution set forth in expressions 4 and 5 can be implemented in discrete digital sampled data format in high speed digital computers. Such adaptation of the analytic reconstruction uses the introduction of approximations dealing, for example, with sampling considerations with regard to the kernel used to filter the weighted projection data, and the conversion of the sampled filtered projections to continuously sampled filtered projections.

In general, the relationships developed above may be applied in a digital sampled data system for processing of projections taken in a rotating fan beam system in which the center of rotation is shifted from not adversely affect the quality of images obtained with the midline of the fan beam. A weighting function is developed from expression 6 which is a function of system geometry and the magnitude of the shift. Transforming expression 6 to the digitally implemented case in which the projection $p(k,\theta_m)$ is a function of the projection bin k and the view angle $\theta_m$, the weighting function for all views as a function of k is defined as:

$$d(k) = \frac{1 + l\zeta_s / R^2}{(1 + l^2 / R^2)^{1/2}} \quad \text{Equation 7}$$

where I=FIX(k-AXIS). The offset AXIS shown in FIG. 13A allows the definition of projection bins beginning at 1 for the first bin. FIX simply indicates that the value in parenthesis is integerized. The projection data $p(k,\theta_m)$ for each view is modified by the weighting function d(k) to provide a weighted projection $g(k,\theta_m)$ as follows:

$$g(k,\theta_m) = d(k)p(k,\theta_m)$$

The discrete values of F(k) are given, within a scale factor used to normalize the final reconstruction, by:

$$F(k) = \begin{cases} \dfrac{\pi}{2} & \text{if } k = 0 \\ -\dfrac{1}{\pi k^2} & \text{if } k \text{ odd} \\ 0 & \text{if } k \text{ even} \end{cases} \quad \text{Equation 8}$$

Thus, the convolution of the modified projection set using the desired filter can be expressed as follows:

$$g'(k, \theta_m) = \sum_{k'} F(k - k') g(k', \theta_m) \quad \text{Equation 9}$$

In practice, the convolution may be performed using Fast Fourier Transform (FFT) operations incorporating the FFT of the kernel and the FFT of the sampled projection. Because of noise and aliasing the kernel may be rolled off using a suitable window.

Each projection set is convolved independently and stored until the modified convolved projection sets are mapped into pixelated space in accordance with the back projection operation. The actual back projection operation uses all values of the filtered projections over a specified range, in contrast to the discrete samples provided by the filtration operation. Typically, the sampled filtered projections are effectively converted to continuously sampled projections using linear interpolation. In the following digital implementation, linear interpolation will be used, appreciating that it is only an approximation to the exact "sine" interpolation that may be used to restore a band-limited sampled signal. In some applications, higher ordered interpolation schemes might be used.

The back projection of the modified convolved projections into pixelated space $(x_i, y_j)$ can be expressed as Equation 10 below:

$$f(x_i, y_j) = \frac{1}{NANG}$$

$$\sum_{m=1}^{NANG} [f_k g'(k, \theta_m) + (1 - f_k) g'(k+1, \theta_m)] x \left[ \frac{R^2}{(R + x_i \cos\theta_m + y_i \sin\theta_m)} \right]$$

where k=FIX(ζ'+AXIS), $(1-f_k)$=ζ'+AXIS-k and ζ' (axis is given by equation 3. The contribution from the discrete modified projections $g'(k, \theta_m)$ may be determined by interpolating between adjacent projection bins, in the present example using linear interpolation. The shift parameter may be accounted for in the back projection by appropriately defining the projection bin k as well as the interpolation factor $f_k$ to account for the shift.

In equation 10, the summation signifies a summation of views for all angles from 1 through NANG. Using linear interpolation, a partial contribution $f_k$ g'(k, $\theta_m$) may be determined from the $k^{th}$ modified projection bin for the particular projection $\theta_m$ and the remaining contribution $(1-f_k)$ g'(k+I,$\theta_m$) from the $(k+1)^{th}$ modified projection bin. The factor in the continuous analytic solution (equation 4 transformed into pixelated coordinates is defined here as 1/U2:

$$\frac{1}{U2} = \frac{R^2}{(R + x_i \cos\theta_m + y_i \sin\theta_m)} \qquad \text{Equation 11}$$

The illustrated back projection can be performed using a special purpose hardware processor, as well as in a general purpose computer. In general, the process may operate on each projection set in turn (each $\theta$), and for each projection set determine the contribution to each pixel B(I,J) based on linear interpolation between adjacent projection bins as determined by the process. In implementing expression 10, the reconstruction $f(x_i,y_j)$ will be stored in the array B(I,J).

The process may first select a first projection set and zero the array B(I,J). Various factors are evaluated which allow the Z (vertical) and W (horizontal) coordinates to be incremented by simple sums and differences. The S and C parameters which are evaluated can be better appreciated with reference to FIG. 13A. It will be recalled that the pixelized space in FIG. 13A is illustrated at an angle $\theta$ with respect to the $\zeta$ axis. Thus, any line drawn through a pixel which is either parallel to the $\zeta$ axis or parallel to ray R (which in turn is perpendicular to the $\zeta$ axis) and intersects the corner of a pixel will form an angle $\theta$ with the pixel edge. A right triangle can be formed with the pixel edge (whose dimension is PWID) and the S parameter will be the length of the side opposite the angle $\theta$. Similarly, the C parameter will be the length of the side adjacent the angle $\theta$. In FIG. 13A, the pixel 1352 shows a triangle having its C side parallel to R, and the pixel 1353 illustrates a similar triangle having its C side parallel to the $\zeta$ axis.

S+C represents the length between the projection of two corners of a pixel (such as corners 1355, 1356) onto the ray R, while S−C represents the length between the projection of the same two corners onto the $\zeta$ axis. Multiplying those projections by n/2 creates projections onto the ray R and $\zeta$ axis equal to the distance from the lower left corner of the pixel (1,1) to the origin. The ZZ and WW values are the initial values for Z and W parameters shown in FIG. 13B. As will become apparent, those values are updated for each pixel to give correct Z and W values for each pixel.

The projection onto the $\zeta$ axis, identified as ZZ, is altered by the value of the shift, by adding the shift $\zeta_s$ that has been incremented. By modifying the back projection geometry with the shift, the previously modified weighted convolved projection sets can be back projected to produce a result wherein both the convolution and back projection are compensated for the shift to produce accurate reconstructions in spite of the shift.

Having now established the initial parameters for the view angle $\theta$, the pixel row index J is initialized. ZZ and WW coordinates identifying the particular row of pixels being back projected at that point in the process are provided. As will become apparent, those coordinates may be altered only when the back projection switches from one row to another in the pixelized space.

The pixel column index I is set, and temporary parameters Z and W may be defined to be incremented as the back projection proceeds along a row of pixels. The Z and W parameters are incremented in dependence on the S and C values for the $\theta$ in question. Thus, the result is to identify parameters related to Z and W for a particular pixel, in the present instance the first pixel in the back projection array B(I,1). The projection bins which contribute to the pixel in question are identified, and the factor U2 is evaluated. More particularly, in evaluating ZF it is seen that the ratio of Z to W is taken then multiplied by R to define the projection of the point in question on the $\zeta$ axis. That point is offset by AXIS which as shown in FIG. 13A is simply an offset which allows the definition of projection bins beginning at 1 for the first bin. The step then defines the projection bins which contribute to the pixel by setting bin index K=FIX(ZF).

The inverse of the factor U2 is evaluated by simply squaring the ratio of W over R. On reference to FIG. 13B, that operation yields the inverse of the factor specified in equation 11. In addition, the factor is divided by PWID. Processing to this point had been accomplished in units of projection bins. In building up image for display, a conversion to units of pixel width may be performed. In emission computed tomography, the units may be defined in terms of counts per unit area; as such, when the back projector is used for emission computed tomography, a division factor of $PWID^2$ may be used.

Having identified the projection bin and the U2 factor, the process proceeds to define a center ray 24 for the midline of the actual back projection. The information previously resident in the memory location for the pixel (I,J), that is B(I,J) is updated by adding an amount linearly interpolated from the K and K+1 projection bins. A proportion of the information in projection bin K, P(K), determined by the difference between the floating point coordinate of projection bin K+1 and ZF, is added to a proportion of the information within projection bin K+1, P(K+1), determined by the difference ZF and the floating point coordinate of projection bin K. That sum is divided by U2, and the result added to B(I,J) to update the information for the information for the pixel in question.

Following the back projection evaluation for the first pixel, the column index I is incremented, the Z and W coordinates are then determined for the next pixel in the row. The evaluation step is again performed, and the back projection operation is then accomplished for that pixel. That loop continues to cycle until it is determined that all columns within the first row have been updated, whereupon the row index J is incremented. The temporary ZZ and WW coordinates are updated before processing the second row. The column index I is again set to 1 and Z and W are redefined in accordance with the coordinates of the first pixel in the second row. The back projection operation may then be performed for all pixels in the second row. The row index J is incremented, and all pixels in that row are back projected until all pixels in the array have been processed. At that point, $\theta$ is incremented to select the next view for processing. In effect, the xy-coordinate system is rotated to the new view angle $\theta$, and the process is repeated for the new view. The process proceeds as described above until contributions are made to all pixels for each view and all views have been processed, whereupon the back projection operation is terminated. The pixelized space at that point contains information back projected from all views such that a display of the information in the pixelized memory produces an image of the cross-section which created the original projections.

Examples of Aircraft and Methods of Fabricating and Operating Aircraft

Figure 14A:
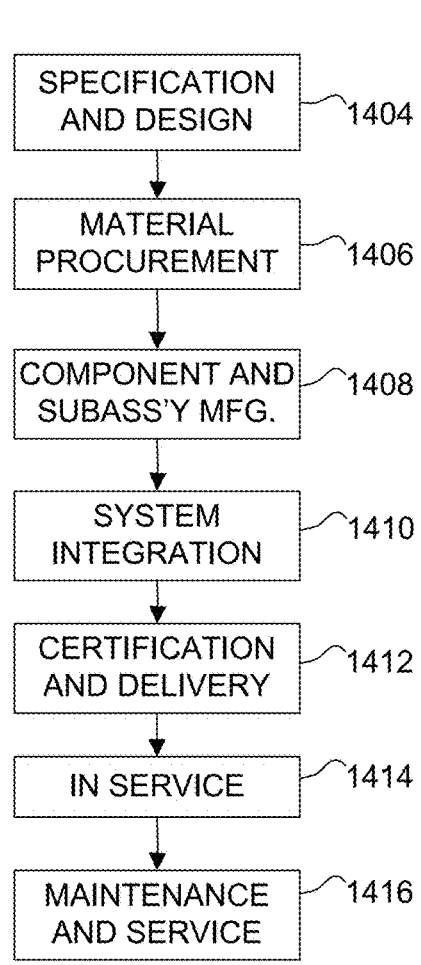
FIG. 14A is a flowchart of aircraft manufacturing and use, in accordance with some embodiments.
Figure 14B:
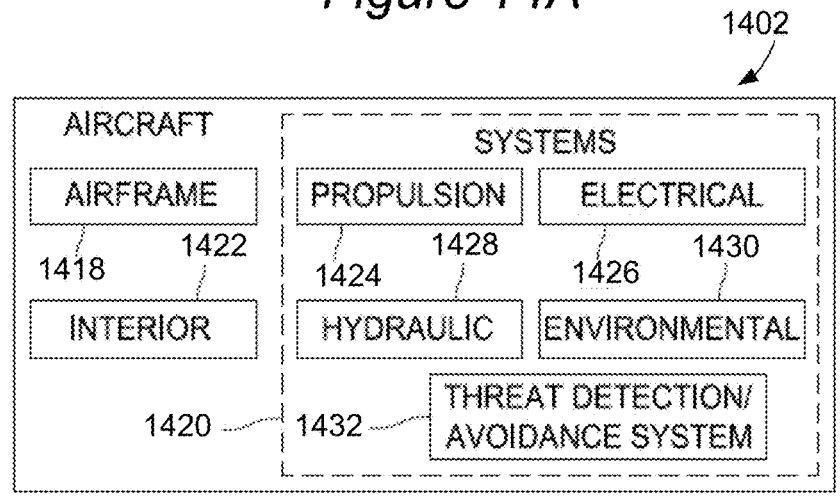
FIG. 14B is a block diagram of aircraft systems, in accordance with some embodiments.

Examples of the present disclosure may be described in the context of aircraft manufacturing and service method 1400 as shown in FIG. 14A and aircraft 1402 as shown in FIG. 14B.

FIG. 14A is a flowchart of aircraft manufacturing and use, in accordance with some embodiments. During pre-production, illustrative method 1400 may include block 1404, specification and design of aircraft 1402 and block 1406, material procurement. During production, block 1408 of component and subassembly manufacturing and block 1410 of inspection system integration of aircraft 1402 may take place. Thereafter, aircraft 1402 may go through block 1412 of certification and delivery to be placed in service at block 1414. While in service, aircraft 1402 may be scheduled for block 1416, routine maintenance and service. Routine maintenance and service may include modification, reconfiguration, refurbishment, etc. of aircraft 1402.

Each of the processes of illustrative method 1400 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

FIG. 14B is a block diagram of aircraft systems, in accordance with some embodiments. Aircraft 1402 produced by illustrative method 1400 may include airframe 1418 with a plurality of high-level inspection systems 1420 and interior 1422. Examples of high-level inspection systems 1420 include one or more of propulsion inspection system 1424, electrical inspection system 1426, hydraulic inspection system 1428, and environmental inspection system 1430. Any number of other inspection systems may be included. Although an aerospace example is shown, the principles disclosed herein may be applied to other industries, such as the automotive industry. Accordingly, in addition to aircraft 1402, the principles disclosed herein may apply to other vehicles, e.g., land vehicles, marine vehicles, space vehicles, etc.

Apparatus and methodology shown or described herein may be employed during any one or more of the stages of manufacturing and service method 1400. For example, components or subassemblies corresponding to block 1408, component and subassembly manufacturing, may be fabricated or manufactured in a manner similar to components or subassemblies produced while aircraft 1402 is in service as in block 1414. Also, one or more examples of the apparatus, methodology, or combination thereof may be utilized during production stages illustrated by block 1408 and block 1410, for example, by substantially expediting assembly of or reducing the cost of aircraft 1402. Similarly, one or more examples of the apparatus or method realizations, or a combination thereof, may be utilized, for example and without limitation, while aircraft 1402 is in service as in block 1414 and/or during maintenance and service as in block 1416.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method (1000, 1050) of determining a center offset distance for computed tomography "CT" imaging in a CT system (100), the method comprising:
   providing (1002) a specimen (108) on a support (104) that is positioned between an emission source (102) for outputting radiation towards the specimen while the specimen rotates with respect to a detector (112) for receiving radiation that has passed through the specimen;
   collecting (1004) projection data (1306) from emissions received at the detector for a plurality of rotational positions of the specimen relative to the detector;
   generating (1004) a sinogram image (902) based on the projection data;
   dividing (1006) the sinogram image into a plurality of image portions (902*a*, 902*b*);
   iteratively moving (1008) the image portions in a superimposed manner relative to each other by a relative offset so that a superimposed image peak (924*a*, 924*b*) in such superimposed image portions has a maximized height;
   defining (1010) a center offset distance for the sinogram image as a relative offset between the superimposed image portions that results in the maximized height, wherein if the center offset distance is zero, the superimposed image portions will be superimposed so that their edges are aligned to result in the maximized height; and
   reconstructing (1014 an image (110) of the specimen from the sinogram image using the defined center offset distance.

2. The method of claim 1, wherein dividing the sinogram image comprises cutting (1056) the sinogram image into a top half (902*a*) and a bottom half (902*b*).

3. The method of claim 2, wherein iteratively moving the image portions in a superimposed manner relative to each other comprises:
   flipping (1058) a first sinogram portion of the top and bottom halves horizontally relative to a second sinogram portion of the top and bottom halves;
   superimposing (1059) the flipped first sinogram portion of the top or bottom half together with the second sinogram portion of the top and bottom halves so as to combine grayscale values for each superimposed position;
   measuring and storing (1060) a height of an image peak in the grayscale values, along with a relative offset between the superimposed flipped first sinogram portion and second sinogram portion; and
   moving (1062) the superimposed flipped first sinogram portion relative to the second sinogram portion and repeating the operation of measuring until a largest peak has been found.

4. The method of claim 3, wherein a dividing line between the top and bottom half is perpendicular to a center line of the sinogram that corresponds to a center of the detector.

5. The method of claim 1, wherein the relative offset and movement between the superimposed image portions corresponds to a fraction of a pixel of the detector.

6. The method of claim 1, wherein the relative offset and movement between the superimposed image portions corresponds to a whole pixel of the detector.

7. The method of claim 1, wherein the image portions are moved in a direction that is perpendicular to a center line of the sinogram that corresponds to a center of the detector.

8. The method of claim 1, wherein reconstructing the image of the specimen includes entering the defined center offset distance, including its polarity, into geometry data for the sinogram image.

9. The method of claim 8, wherein defined center offset distance is only entered into the geometry data for the sinogram image if the defined center offset distance differs from an offset determined by native software of the CT system by more than a predefined limit; and otherwise, using the offset that is determined by native software of the CT system.

10. The method of claim 1, wherein the sinogram image is preprocessed to form an outline image around the sinogram peak area portions before the image portions are iteratively moved.

11. A computed tomography (CT) system, comprising:
an emission source (102) for outputting radiation towards a specimen (108);
a support (104) for placement of the specimen (108) and that is rotatable and positioned between the emission source and a detector (112) while the specimen rotates with respect to such detector;
the detector for receiving radiation that has passed through the specimen; and
a processor (150b) and memory (150a) configured for performing the following operations:
collecting (1004) projection data (1306) from emissions received at the detector for a plurality of rotational positions of the specimen relative to the detector;
generating (1004) a sinogram image (902) based on the projection data;
dividing (1006) the sinogram image into a plurality of image portions (902a, 902b);
iteratively moving (1008) the image portions in a superimposed manner relative to each other by a relative offset so that a superimposed image peak (924a, 924b) in such superimposed image portions has a maximized height;
defining (1010) a center offset distance for the sinogram image as a relative offset between the superimposed image portions that results in the maximized height, wherein if the center offset distance is zero, the superimposed image portions will be superimposed so that their edges are aligned to result in the maximized height; and
reconstructing (1014) an image (110) of the specimen from the sinogram image using the defined center offset distance.

12. The system of claim 11, wherein dividing the sinogram image comprises cutting (1056) the sinogram image into a top half (902a) and a bottom half (902b).

13. The system of claim 12, wherein iteratively moving the image portions in a superimposed manner relative to each other comprises:
flipping (1058) a first sinogram portion of the top and bottom halves horizontally relative to a second sinogram portion of the top and bottom halves;
superimposing (1059) the flipped first sinogram portion of the top or bottom half together with the second sinogram portion of the top and bottom halves so as to combine grayscale values for each superimposed position;
measuring and storing (1060) a height of an image peak in the grayscale values, along with a relative offset between the superimposed flipped first sinogram portion and second sinogram portion; and
moving (1062) the superimposed flipped first sinogram portion relative to the second sinogram portion and repeating the operation of measuring until a largest peak has been found.

14. The system of claim 13, wherein a dividing line between the top and bottom half is perpendicular to a center line of the sinogram that corresponds to a center of the detector.

15. The system of claim 11, wherein the relative offset and movement between the superimposed image portions corresponds to a fraction of a pixel of the detector.

16. The system of claim 11, wherein the relative offset and movement between the superimposed image portions corresponds to a whole pixel of the detector.

17. The system of claim 11, wherein the image portions are moved in a direction that is perpendicular to a center line of the sinogram that corresponds to a center of the detector.

18. The system of claim 11, wherein reconstructing the image of the specimen includes entering the defined center offset distance, including its polarity, into geometry data for the sinogram image.

19. The system of claim 18, wherein defined center offset distance is only entered into the geometry data for the sinogram image if the defined center offset distance differs from an offset determined by native software of the CT system by more than a predefined limit; and otherwise, using the offset that is determined by native software of the CT system.

20. The system of claim 11, wherein the sinogram image is preprocessed to form an outline image around the sinogram peak area portions before the image portions are iteratively moved.

* * * * *